(12) United States Patent
Branthomme et al.

(10) Patent No.: US 10,861,342 B2
(45) Date of Patent: Dec. 8, 2020

(54) SYSTEM FOR DISPLAYING INFORMATION RELATED TO A FLIGHT OF AN AIRCRAFT AND ASSOCIATED METHOD

(71) Applicant: DASSAULT AVIATION, Paris (FR)

(72) Inventors: Arnaud Branthomme, St Remy l'Honore (FR); Igor Fain, Bezons (FR); Patrick Darses, Istres (FR)

(73) Assignee: DASSAULT AVIATION, Paris (FR)

( * ) Notice: Subject to any disclaimer, the term of this patent is extended or adjusted under 35 U.S.C. 154(b) by 598 days.

(21) Appl. No.: 15/158,802

(22) Filed: May 19, 2016

(65) Prior Publication Data

US 2016/0343260 A1 Nov. 24, 2016

(30) Foreign Application Priority Data

May 19, 2015 (FR) ...................................... 15 01022

(51) Int. Cl.
*G06T 15/00* (2011.01)
*G08G 5/00* (2006.01)
(Continued)

(52) U.S. Cl.
CPC ........... *G08G 5/0086* (2013.01); *B64D 43/00* (2013.01); *G01C 23/00* (2013.01); *G06T 15/205* (2013.01);
(Continued)

(58) Field of Classification Search
USPC ................................................ 345/419, 427
See application file for complete search history.

(56) References Cited

U.S. PATENT DOCUMENTS

| 7,855,664 B2 * | 12/2010 | Morizet ................. G01C 23/00 340/945 |
| 8,089,375 B1 * | 1/2012 | Seah ....................... G01C 23/00 340/971 |

(Continued)

FOREIGN PATENT DOCUMENTS

FR 2 988 510 A1 9/2013

OTHER PUBLICATIONS

French Search Report of priority application.

*Primary Examiner* — Weiming He
(74) *Attorney, Agent, or Firm* — Davidson, Davidson & Kappel, LLC

(57) ABSTRACT

A system for displaying information related to a flight of an aircraft and an associated method are provided. The display system comprises a dynamic synthesis image generating module, configured to generate at least two successive transition synthesis images between an image according to a first type of perspective and an image according to a second type of perspective, or between an image according to a second type of perspective and an image according to a first type of perspective, respectively, and to command the display thereof at successive transition moments. Each transition image is centered around an intermediate central point of interest, seen from an intermediate point of view situated at an intermediate observation distance from the intermediate central point of interest, which is an increasing function, a decreasing function, respectively, of the transition moment at which the image is displayed, and seen from an intermediate opening angle, which is a decreasing function, an increasing function, respectively, of the transition moment at which this image is displayed.

10 Claims, 6 Drawing Sheets

(51) Int. Cl.
  *G01C 23/00* (2006.01)
  *B64D 43/00* (2006.01)
  *G06T 15/20* (2011.01)
  *G09G 5/377* (2006.01)

(52) U.S. Cl.
  CPC ......... *G08G 5/0047* (2013.01); *G08G 5/0078* (2013.01); *G08G 5/0091* (2013.01); *G09G 5/377* (2013.01); *G09G 2340/04* (2013.01); *G09G 2380/12* (2013.01)

(56) References Cited

U.S. PATENT DOCUMENTS

| | | | | |
|---|---|---|---|---|
| 8,140,252 B2* | 3/2012 | Wise | ............ | G01C 21/00 701/120 |
| 8,339,284 B2* | 12/2012 | He | ............ | G01C 23/005 340/945 |
| 8,344,911 B1* | 1/2013 | Wenger | ............ | G01C 23/00 340/973 |
| 8,847,794 B2* | 9/2014 | Buratto | ............ | G08G 5/0091 340/971 |
| 8,963,742 B1* | 2/2015 | Seah | ............ | G01C 23/00 340/971 |
| 2002/0143439 A1* | 10/2002 | Morizet | ............ | G01C 23/00 701/3 |
| 2004/0225420 A1* | 11/2004 | Morizet | ............ | G01C 23/005 701/3 |
| 2008/0195309 A1 | 8/2008 | Prinzel et al. | | |
| 2008/0252636 A1* | 10/2008 | Servantie | ............ | G01C 21/00 345/418 |
| 2010/0145599 A1* | 6/2010 | Wise | ............ | G01C 21/00 701/120 |
| 2012/0194556 A1* | 8/2012 | Schmitt | ............ | G08G 5/0086 345/641 |
| 2013/0249712 A1 | 9/2013 | Buratto et al. | | |

\* cited by examiner

SYSTEM FOR DISPLAYING INFORMATION RELATED TO A FLIGHT OF AN AIRCRAFT AND ASSOCIATED METHOD

This claims the benefit of French Patent Application FR 15 01022, filed May 19, 2015 and hereby incorporated by reference herein.

The present invention relates to a system for displaying information related to a flight of an aircraft, said system comprising a module for dynamically generating synthesis images, configured to generate synthesis images, each synthesis image comprising a depiction of the environment situated in the vicinity of a trajectory of the aircraft.

Such a system is for example designed to be installed in the cockpit of an aircraft to be associated with a viewer of the cockpit, or on the ground, in particular in a ground station, for example in a mission preparation system, etc. The viewer device is for example a head down monitor integrated into the dashboard of the cockpit, or a monitor of a mission preparation system.

BACKGROUND

To facilitate the piloting of the aircraft, and to give the pilot global information about the structure of the terrain situated opposite the aircraft, it is known to generate synthetic images of the landscape around the aircraft, in particular from topographical databases, based on the current position of the aircraft determined by the navigation system of the aircraft.

The synthetic images generally comprise a synthetic surface depiction of the terrain. Such a viewing system allows the operator to see the relief that may be found around the aircraft, and may also make it possible for the operator to move the point on which the image is centered in order to view terrain zones located around the position of the aircraft.

The synthetic images are for example three-dimensional images, showing the trajectory of the aircraft and the surrounding terrain according to a first perspective making it possible to provide the operator or a pilot with a clear depiction of the situation of the aircraft relative to its environment. Such images make it possible to improve the operator's awareness of the situation and simplify his decision-making process, in particular by preventing the operator from having to mentally reconstruct the necessary three-dimensional information from images seen from above and the side.

The synthetic images can also be seen according to a second perspective, for example vertical and/or horizontal views of the trajectory of the aircraft, i.e., top or side views of that trajectory. Such images are for example two-dimensional. Such images are more particularly suitable for precision activities, in particular for viewing the vertical trajectory of the aircraft during an ascent or descent phase, or to redefine the passage points of the flight plan.

SUMMARY OF THE INVENTION

Each of the first and second perspectives is adapted to a particular situation. It is therefore desirable to have a system that makes it possible to have the most appropriate perspective for each moment at that moment.

Nevertheless, an abrupt transition between these two perspectives may prove startling and cause a harmful loss of reference for the pilot or operator.

One aim of the invention is therefore to provide a system for viewing information related to a flight of an aircraft that is capable of displaying, at any moment, an image showing the relevant information for an operator according to an appropriate perspective, without causing a loss of reference for the operator or pilot during a transition from one perspective to another.

To that end, the invention relates to a system of the aforementioned type, characterized in that said generating module is configured to generate at least two successive three-dimensional transition synthesis images between a three-dimensional synthesis image according to a first type of perspective and a synthesis image according to a second type of perspective, or between a synthesis image according to a second type of perspective and a three-dimensional synthesis image according to a first type of perspective, respectively, and to command the successive display of said three-dimensional transition synthesis images by a display device at successive transition moments, each of said three-dimensional transition synthesis images being depicted according the first type of perspective, centered around an intermediate central point of interest, seen from an intermediate point of view located at an intermediate viewing distance from said intermediate central point of interest and seen from an intermediate opening angle, the intermediate observation distance of each three-dimensional transition synthesis image being an increasing function, or a decreasing function, respectively, of the transition moment at which said three-dimensional transition synthesis image is displayed, and the intermediate opening angle of each three-dimensional transition synthesis image being a decreasing function, or an increasing function, respectively, of the transition moment at which said three-dimensional transition synthesis image is displayed.

The system according to the invention may comprise one or more of the following features, considered alone or according to any technically possible combination:

- there exits at least one first and one second successive transition moments, said second transition moment being after said first transition moment, such that:
  - the intermediate observation distance of a first three-dimensional transition synthesis image destined to be displayed at said first transition moment is strictly greater, or strictly less, respectively, than the intermediate observation distance of a second three-dimensional transition synthesis image destined to be displayed at said second transition moment,
  - the intermediate opening angle of said first three-dimensional transition synthesis image is strictly smaller, or strictly larger, respectively, than the intermediate opening angle of said second three-dimensional transition synthesis image;
- the intermediate observation distance of each three-dimensional transition synthesis image is a strictly increasing function, or a strictly decreasing function, respectively, of the transition moment at which that three-dimensional transition synthesis image is displayed;
- the generating module is configured to determine the observation distance of each three-dimensional transition synthesis image according to a nonlinear function, preferably convex, of the transition moment at which that three-dimensional transition synthesis image is displayed;
- the opening angle of each three-dimensional transition synthesis image is a strictly decreasing function, or a strictly increasing function, respectively, of the transition moment at which that three-dimensional transition synthesis image is displayed;

said synthesis image according to the first type of perspective being centered around a given central point of interest, seen from a point of view situated at a given observation distance from said central point of interest, and seen from a given opening angle, the opening angle of each three-dimensional transition synthesis image is strictly larger than the opening angle of said synthesis image according to the first type of perspective and the observation distance of each three-dimensional transition synthesis image is strictly greater than the observation distance of said synthesis image according to the first type of perspective;

the generating module is configured to determine the opening angle and the observation distance of each three-dimensional transition synthesis image as a function of the opening angle and the observation distance of said synthesis image according to the first type of perspective;

said generating module is configured to determine the opening angle and the observation distance of each three-dimensional transition synthesis image as a function of the opening angle and the observation distance of said synthesis image according to the first type of perspective such that at least one dimension of the zone depicted by each three-dimensional transition synthesis image is comprised in a predetermined bounded interval around the corresponding dimension of the zone depicted by said synthesis image according to the first type of perspective;

said generating module is configured to:
  command the display of said synthesis image according to the first type of perspective at an initial moment,
  command the successive display of the successive three-dimensional transition synthesis images between the synthesis image according to the first type of perspective and the synthesis image according to the second type of perspective at said successive transition moments, said transition moments being after said initial moment;
  command the display of said synthesis image according to the second type of perspective at a final moment after said transition moments;

said generating module is configured to:
  command the display of said synthesis image according to the second type of perspective at an initial moment,
  command the successive display of the successive three-dimensional transition synthesis images between the synthesis image according to the second type of perspective and the synthesis image according to the first type of perspective at said successive transition moments, said transition moments being after said initial moment;
  command the display of said synthesis image according to the first type of perspective at a final moment after said transition moments;

said generating module is configured to assign a depth attribute to each pixel of a synthesis image located in a zone with a predetermined depth of the transition images, with the exception of pixels situated outside said predetermined depth zone, said predetermined depth zone being defined at least by a predetermined maximum altitude.

The invention also relates to a method for displaying information related to a flight of an aircraft, said method comprising:
  a step for generating a synthesis image according to a first type of perspective,
  a step for generating a synthesis image according to a second type of perspective,
  said method being characterized in that it further comprises:
  generating at least two successive three-dimensional transition images between said synthesis image according to the first type of perspective and said synthesis image according to the second type of perspective, or between said synthesis image according to the second type of perspective and said synthesis image according to the first type of perspective, respectively,
  the successive display of said three-dimensional transition synthesis images by a display device at a plurality of successive transition moments,
  each of said synthesis images comprising a depiction of the environment situated in the vicinity of a trajectory of the aircraft,
  each of said three-dimensional transition synthesis images being centered around an intermediate central point of interest, seen from an intermediate point of view situated at an intermediate observation distance from said intermediate central point of interest and seen from an intermediate opening angle,
  the intermediate observation distance of each three-dimensional transition synthesis image being an increasing function, or a decreasing function, respectively, of the transition moment at which said three-dimensional transition synthesis image is displayed, and the intermediate opening angle of each three-dimensional transition synthesis image being a decreasing function, or an increasing function, respectively, of the transition moment at which said three-dimensional transition synthesis image is displayed.

The method according to the invention may comprise one or more of the following features, considered alone or according to any technically possible combination:
  the method further comprises:
    a step for displaying said synthesis image according to the first type of perspective at an initial moment before said transition moments,
    a step for displaying said synthesis image according to the second type of perspective at a final moment after said transition moments;
  the method further comprises:
    a step for displaying said synthesis image according to the second type of perspective at an initial moment before said transition moments,
    a step for displaying said synthesis image according to the first type of perspective at a final moment after said transition moments.

BRIEF DESCRIPTION OF THE DRAWINGS

The invention will be better understood upon reading the following description, provided solely as an example and done in reference to the drawings, in which.

DETAILED DESCRIPTION

Figure 1:
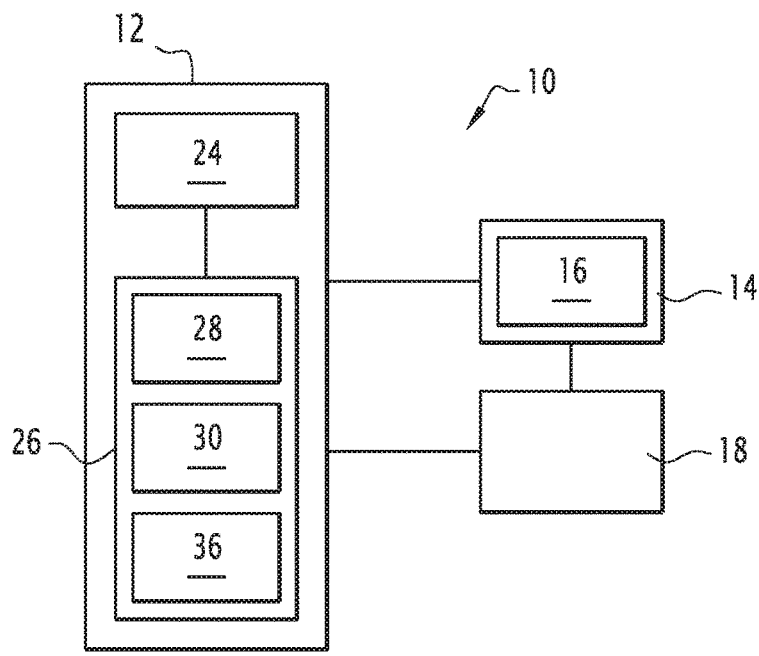
FIG. 1 diagrammatically illustrates a display system according to one embodiment of the invention.

A first system 10 for viewing information related to a flight of an aircraft is diagrammatically illustrated by FIG. 1.

This system 10 is for example intended to be mounted in an aircraft, in particular in a cockpit, intended for the crew of the aircraft, in the cabin, or intended for passengers of the aircraft. Alternatively, the system 10 may also be located on the ground, in particular in a ground station, and can be intended for the preparation of missions or to control an aircraft remotely from the ground station.

The system 10 comprises a central processing unit 12 and a display device 14.

The display device 14 comprises a monitor 16 and means for processing graphic information, for example a graphics processor and an associated graphics memory.

The graphics processor is suitable for processing graphic information stored in the graphics memory and displaying that information or of a depiction thereof on the monitor 16.

The system 10 further comprises a man-machine interface 18 for the adjustment of parameters of the display on the display device 14 by an operator, for example a member of the crew of the aircraft, a passenger, or a ground operator. The man-machine interface 18 for example comprises a tactile control device, configured to detect the position of one or more members, hereinafter called control members, on a surface of that tactile control device. In a known manner, these control members can be a stylus or the fingers of an operator.

Some tactile control device technologies make it possible to detect the position of control members without there being contact between the control member and the surface of the tactile control device. Subsequently, the expression "on" a surface or "on" a monitor must be understood as meaning "on or near" that surface or monitor.

In the next part of the description, we will consider an embodiment in which this tactile control device and the monitor 16 have a shared shape, in the form of a touch-screen.

Thus, the man-machine interface 18 is configured to detect the position of one or more members, hereinafter called control members, on the surface of the monitor 16. In a known manner, these control members can be a stylus or the fingers of an operator.

The central processing unit 12 is suitable for executing applications necessary for the operation of the system 10.

To that end, the central processing unit 12 comprises a processor 24 and one or more memories 26.

The processor 24 is suitable for executing applications contained in the memory 26, in particular an operating system allowing the traditional operation of a computer system.

The memory 26 comprises different memory zones in particular containing a cartographical database 28, flight data 30 relative to a flight plan of the aircraft, and applications intended to be executed by the processor 24.

The flight data 30 in particular comprises a planned trajectory for the aircraft, as well as a set of geographical points associated with the flight plan with which constraints can be associated, in particular altitude, speed and time constraints, for example an altitude above, below or at which the aircraft must fly.

The memory 26 comprises an application 36 for dynamically generating synthesis images, also hereinafter called dynamic synthesis image generating module or dynamic synthesis image generator 36, for their display by the display device 14.

The dynamic synthesis image generating module 36 is configured to generate synthesis images representative of the environment situated near the trajectory of the aircraft, and to control the display thereof by display viewing device 14. The module 36 is also configured to detect actions done by an operator, using the man-machine interface 18, to modify generated synthesis images, in particular actions to modify parameters of these images, and to generate modified synthesis images in response to such modification actions.

The module 36 is configured to generate synthesis images according to a first type of perspective.

The synthesis images according to the first type of perspective are three-dimensional synthesis images. The first type of perspective is preferably a conical perspective, i.e., with a vanishing point.

Figure 2:
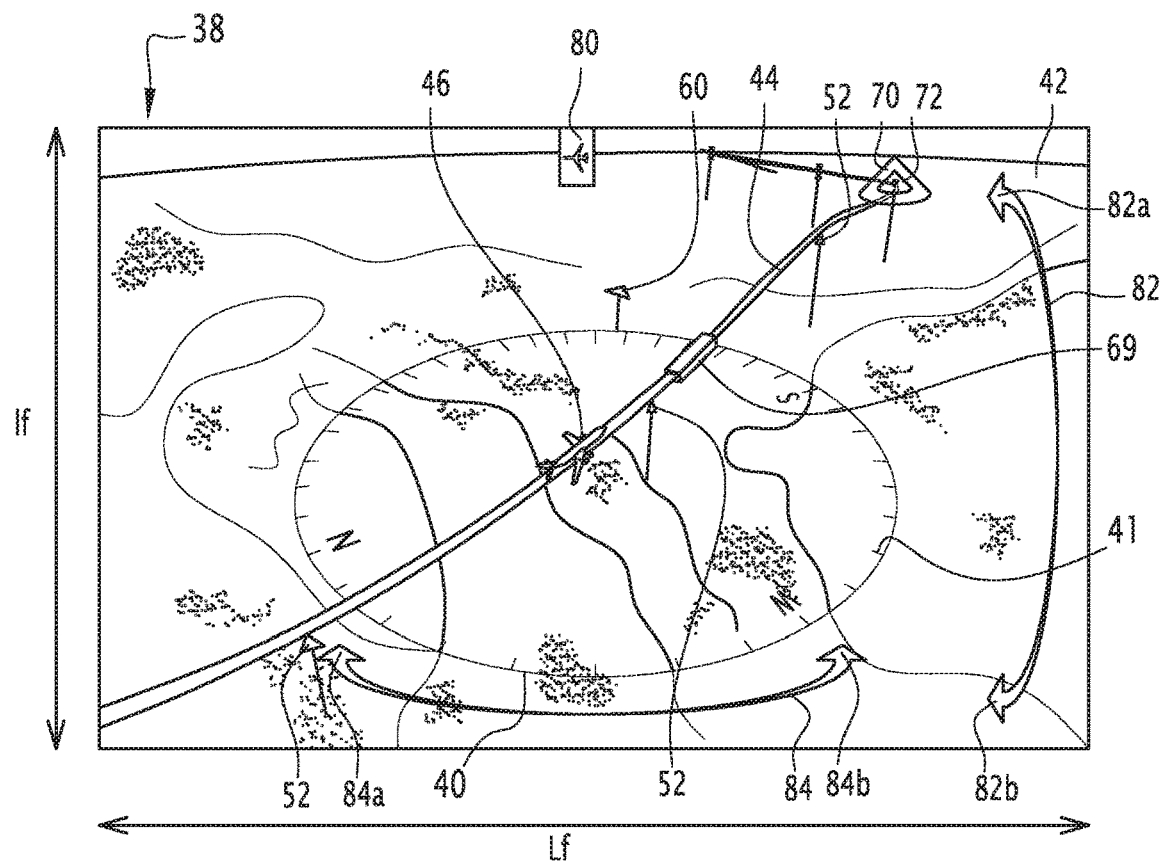
FIG. 2 diagrammatically shows a three-dimensional synthesis image according to a first type of perspective.

As diagrammatically illustrated in FIG. 2, each synthesis image according to the first type of perspective, denoted 38, comprises a synthetic depiction 42 of the environment situated in the vicinity of the trajectory of the aircraft, in particular of the terrain and its relief.

This depiction may comprise aeronautic data, such as airports and their landing strips and/or geographical references, such as cities, bodies of water (rivers, lakes, seas).

The synthesis images according to the first type of perspective can either be egocentric, i.e., seen from a point of view corresponding to the current position of the aircraft, for example a point of view situated in the cockpit of the aircraft, or exocentric, i.e., seen from a virtual camera, situated at a point other than the current position of the aircraft. In particular, an exocentric image can correspond to an image that would be seen by a virtual camera situated outside the aircraft and viewing the aircraft.

Subsequently, the point of view Pv will refer to the point in space from which an image is seen. The position of this point of view Pv corresponds to the position of the aforementioned virtual camera.

The module 36 is also configured to generate synthesis images according to a second type of perspective.

The synthesis images according to the second type of perspective are for example images seen from an axonometric perspective, which has no vanishing point and preserves the ratios between any length considered in a direction in space and that same length measured in its depiction in the image. Such a perspective is also called cylindrical, orthographic, parallel or orthonormal perspective.

The synthesis images according to the second type of perspective are for example vertical projection views, making it possible to view the vertical trajectory of the aircraft, and/or horizontal projection views, illustrating the horizontal trajectory of the aircraft.

Figure 3:
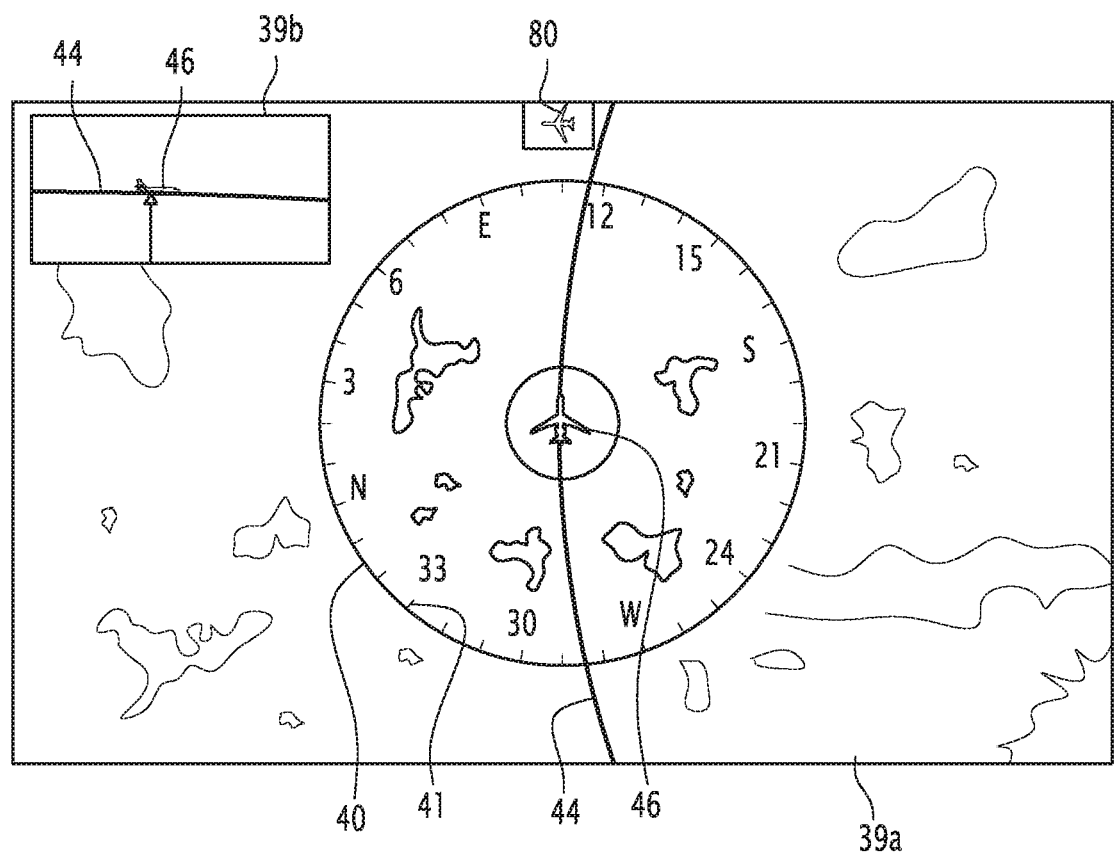
FIG. 3 is a diagrammatic view of a synthesis image according to a second type of perspective, seen from above.

An example of a synthesis image 39a according to the second type of perspective, in horizontal projection, i.e., seen from above, is illustrated in FIG. 3. Superimposed on this image is a synthesis image 39b according to the second type of perspective in vertical projection, i.e., seen from the side.

The visual impression of synthesis images according to an axonometric perspective seen from above or seen from the side comes much closer to the visual impression of two-dimensional images seen from above or seen from the side, respectively. Thus, alternatively, the synthesis images according to the second type of perspective are real two-dimensional images, without depth.

Preferably, in the synthesis images according to the first and second types of perspective, the vertical dimensions are shown on a larger scale than the horizontal dimensions. In particular, the terrain as well as the objects shown in the synthesis images are resized by a predefined factor, for example three, along the vertical axis, so as to make the altitude variations between the terrain, the aircraft and the different objects more easily perceptible by a user.

Each synthesis image is centered on a point hereinafter called the central point of interest Pc.

In particular, each synthesis image according to the first type of perspective is centered on a central point of interest Pc situated at an observation distance Z from the point of view Pv of the image.

The point of view Pv and the central point of interest Pc define a direction forming, with a horizontal plane, a viewing angle hereinafter called vertical angular position and denoted $a_v$. In particular, a zero vertical angular position is associated with the point of view situated in the horizontal plane containing the central point of interest Pc, and a negative vertical angular position is associated with the point of view situated below the horizontal plane containing the central point of interest Pc, while a positive vertical angular position is associated with the point of view situated above the horizontal plane containing the central point of interest Pc.

The point of view Pv and the central point of interest Pc furthermore define a direction forming, with a predefined vertical plane, for example a vertical plane tangent to the trajectory of the aircraft, a viewing angle hereinafter called horizontal angular position and denoted $a_h$. In particular, a zero horizontal angular position is associated with a point of view situated upstream from a central point of interest Pc in the direction of the trajectory, the direction formed between the point of view and the central point of interest being parallel to the vertical plane tangent to the trajectory of the aircraft. A horizontal angular position of less than 90 degrees in absolute value is associated with a point of view situated upstream from the central point of interest Pc in the direction of the trajectory, while a horizontal position greater than 90 degrees in absolute value is associated with a point of view situated downstream from the central point of interest Pc in the direction of the trajectory.

Each synthesis image according to the first type of perspective represents an observation volume substantially corresponding to a pyramid, hereinafter called observation pyramid, with a horizontal opening angle denoted a1 and a vertical opening angle denoted a2.

Each synthesis image according to the first type of perspective therefore represents a zone with length $$A1 = 2Z \tan\left(\frac{a1}{2}\right)$$

and width $$A2 = 2Z \tan\left(\frac{a2}{2}\right).$$

The ratio between the length A1 and the width A2 is determined as a function of the dimensions of the displayed image.

Indeed, the synthesis images are intended to be displayed on a window of the monitor 16, the length $L_f$ and width $l_f$ of which are preferably fixed.

Each synthesis image according to the second type of perspective also depicts a zone with length A1 and width A2. In the images according to the second type of perspective that are seen from the side, the width A2 in reality corresponds to the height of the depicted zone.

The synthesis images according to the second type of perspective depict the environment using a given scale, which is defined as the ratio between the length $L_f$ of the window in which the image is displayed and the actual length A1 of the zone depicted in that image. At a constant length $L_f$, the scale of an image according to the second type of perspective is therefore defined by the actual length A1 of the zone depicted in that image.

By extension, the "scale" of an image according to the first type of perspective will refer to the ratio between the length $L_f$ of the window in which the image is displayed and the quantity $$2Z \tan\left(\frac{a1}{2}\right)$$

corresponding to the actual length A1 of the zone depicted in that image. With a constant horizontal opening angle, the scale of an image according to the first type of perspective is therefore defined by the distance Z between the point of view Pv and the central point of interest Pc.

In general, the apparent size of an object will henceforth refer to the size of that object as displayed on the monitor, and the actual size will refer to its size relative to the environment.

Each synthesis image includes a scale indicator 40. This scale indicator 40 is for example a disc with a constant apparent diameter. Thus, the actual diameter of this disc, relative to the depicted environment, varies as a function of the scale of the image.

Thus, the scale of a synthesis image according to the first type of perspective or according to the second type of perspective is equal to the ratio between the apparent diameter of the disc 40, which is preferably constant, and the actual diameter of that disc, which varies as a function of the scale of the image.

Preferably, the actual value of the diameter or radius of this disc relative to the depicted environment is displayed, which allows a user to ascertain the depiction scale of the image. This disc 40 is centered on the current position of the aircraft. Furthermore, the disc 40 is preferably provided at its periphery with graduations 41 indicating a heading relative to the current position of the aircraft.

Each synthesis image further includes, when at least one portion of the trajectory of the aircraft is included in the zone depicted in the synthesis image, a curve 44 representative of this trajectory portion, this curve 44 being superimposed on the synthesis depiction of the environment.

Preferably, the trajectory portion is shown in the synthesis image in the form of a ribbon. Such a form in particular allows a user to perceive the roll associated with each point of the trajectory.

The ribbon is for example a solid colored ribbon.

Furthermore, in the synthesis images according to the first type of perspective, the actual width of this ribbon is for example constant. Thus, the apparent width of the ribbon displayed in the synthesis image at a given point of the trajectory depends on the distance between this given point and the point of view of the synthesis image, which allows a user to perceive this distance.

Preferably, an outline of the wireframe type is superimposed on this ribbon, for example in the form of two lines defining the width of the ribbon, and the thickness of which is constant over the entire displayed image. Such an outline makes it possible to make the trajectory visible even at points very remote from the point of view of the image.

Furthermore, the portion of the trajectory closest to the point of view, i.e., situated at a distance from the point of view of the image smaller than a first predetermined threshold distance, can be done only by an outline of the wireframe type. In this case, the colored ribbon preferably has an increasing transparency from a point of the trajectory situated at a second threshold distance from the point of view, greater than the first threshold distance, up to the point of the trajectory situated at the first threshold distance, for which the ribbon is completely transparent. Such a transparency makes it possible to avoid overloading the synthesis image.

Each synthesis image may also include symbolic objects. In particular, these objects are seen from the first or second type of perspective, depending on whether the synthesis image is seen from the first or second type of perspective, respectively.

These symbolic objects are for example representative of the position of passage points, which may or may not be associated with constraints, altitude profile points associated with the trajectory of the aircraft, the position of the aircraft and/or objects that could interfere with the trajectory of the aircraft, for example clouds, storm cells or other aircraft.

A first symbolic object 46 illustrates a position of the aircraft along the trajectory. This generally involves the current position of the aircraft, or a future position of the aircraft, in the case of the display of synthesis images representing a simulation of a flight or of a particular flight phase of the aircraft.

The passage points comprise passage points associated with a vertical constraint, for example an altitude above, below, or at which the aircraft must fly.

The altitude profile points are points specific to the trajectory of the aircraft corresponding to a change in flight phase. These points in particular comprise a top of climb (TOC) point, which corresponds to the transition point between the ascent phase and the cruising phase of the aircraft along the planned trajectory, a top of descent (TOD) point, from which the aircraft must begin its descent phase, and one or more bottom of step climb (BOSC) points.

Preferably, the three-dimensional shape of each symbolic object according to the first type of perspective is chosen so as to be easily recognizable and distinguishable from the shapes of other symbolic objects of different types, irrespective of the viewing angle from which the symbolic object is viewed. Furthermore, this three-dimensional shape must also be chosen so as to be able to be displayed from the second type of perspective without a loss of visual reference for user, in particular during a transition between an image according the first type of perspective and an image according to the second type of perspective, while remaining recognizable when it is seen according to the second type of perspective.

Furthermore, each symbolic object can be extended on the synthesis images by a vertical line extending at ground level or up to a predetermined altitude, for example the current altitude of the aircraft. Furthermore, the images according to the first type of perspective advantageously depict the shadows projected on each symbolic object on the ground or on a predetermined altitude plane, which is for example the current altitude of the aircraft. The vertical line and the shadow associated with each symbolic object make it possible to provide the user with an improved perception of the three-dimensional position of that object.

The symbolic objects representative of passage points associated with altitude constraints, seen from the side, differ from symbolic objects representative of passage points not associated with altitude constraints and altitude profile points. Furthermore, the symbolic object representative of passage points associated with altitude constraints above, below, or at which the aircraft must fly, respectively, differ from one another seen from the side.

Thus, the passage points not associated with altitude constraints, the passage points associated with altitude constraints above, below, or at which the aircraft must fly and the altitude profile points can be distinguished from one another in the synthesis images according to the second type of perspective, seen from the side, illustrating the vertical trajectory of the aircraft.

Furthermore, seen from above, the symbolic objects representative of passage points differ from the symbolic objects representative of altitude profile points.

Thus, the passage points and the altitude profile points can be distinguished from one another in synthesis images according to the second type of perspective, seen from above, illustrating the horizontal trajectory of the aircraft.

Figure 4:
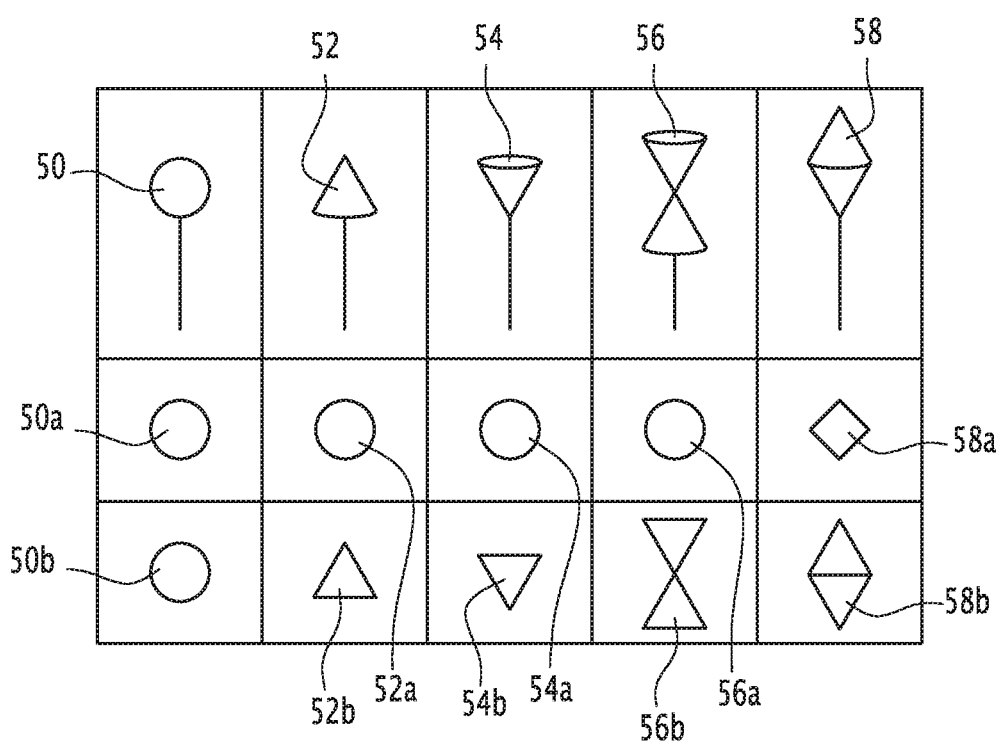
FIG. 4 shows several example depictions of symbolic objects, according to the first and second types of perspective.

As an example, FIG. 4 shows example depictions of symbolic objects according to the first type of perspective, as well as the depiction of the same objects according to the second type of perspective, seen from above and from the side.

FIG. 4 thus shows a three-dimensional symbolic object 50 representative of a passage point not associated with a constraint, according to the first type of perspective, as well as the depiction of that object seen from above 50a and seen from the side 50b according to the second type of perspective.

FIG. 4 also shows three-dimensional symbolic objects 52, 54 and 56 representative of passage points respectively associated with an altitude above which the aircraft must fly, an altitude below which the aircraft must fly, and an altitude at which the aircraft must fly, according to the first type of perspective, as well as depictions of these objects seen from above 52a, 54a, 56a and seen from the side 52b, 54b and 56b, according to the second type of perspective.

FIG. 4 further illustrates a three-dimensional symbolic object 58 representative of an altitude profile point, for example of the TOD, TOC or BOSC type, according to the first type of perspective, as well as depictions of this object seen from above 58a and seen from the side 58b, according to the second type of perspective.

Furthermore, the three-dimensional shape according to the first type of perspective of the symbolic object representative of the position of the aircraft and of other aircraft that may interfere with the trajectory of the aircraft, is chosen such that the orientation of the aircraft, seen from the side, is quickly detectable. Preferably, the vertical line associated with a symbolic object representative of the position of the aircraft extends to the current altitude of the aircraft, and the shadow of such an object is the shadow projected on a plane at the current altitude of the aircraft, which makes it possible to facilitate the comparison between the current altitude of the aircraft and the altitude of surrounding aircraft.

Figure 5:
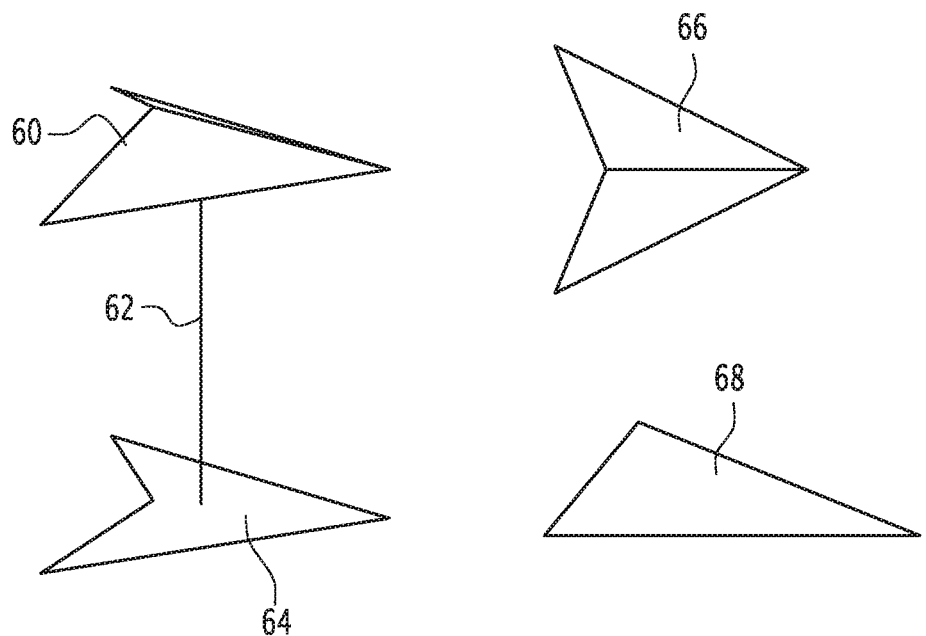
FIG. 5 illustrates an example depiction of a symbolic object representative of the position of the aircraft according to the first and second types of perspective.

FIG. 5 thus shows a three-dimensional example depiction 60 according to the first type of perspective of a symbolic object representative of the position of an aircraft, with which a vertical line 62 and a projected shadow 64 are associated. FIG. 5 also shows depictions of this object seen from above 66 and from the side 68 according to the second type of perspective.

Preferably, when another aircraft may interfere with the trajectory of the aircraft, the module 36 is configured to thicken and/or underline the affected portion of the trajectory, for example in red, as illustrated in FIG. 2 by reference 69.

Clouds and storms cells are depicted on the scale of the synthesis images, in particular from weather information received from a weather radar, in particular three-dimensional, positioned in the aircraft, or from a ground station.

Figure 6:
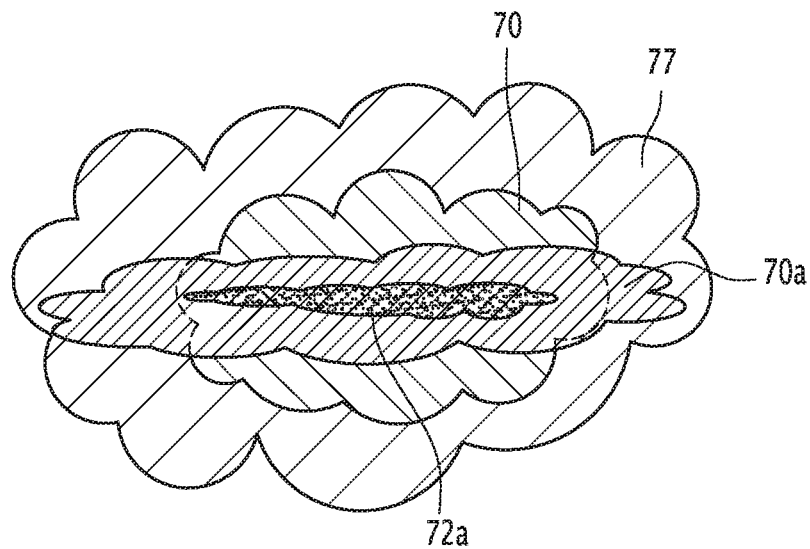
FIG. 6 illustrates an example three-dimensional depiction of a symbolic image representative of a cloud and a storm cell according to the first type of perspective.

As illustrated in FIG. 6, the clouds and storms cells are depicted in the three-dimensional synthesis images according to the first type of perspective in the form of colored three-dimensional masses 70, 72, respectively, which are preferably transparent, so as not to hide the objects, in particular an aircraft, an altitude profile passage or a trajectory portion, located behind or within the cloud or storm cell.

Preferably, one or more sectional views 70a, 72a of the cloud or the storm cell is/are superimposed on the associated three-dimensional mass in order to allow the user to see the size and internal structure of the cloud or storm cell. As illustrated in FIG. 6, this for example involves horizontal or vertical cross-sections, in a plane that intersects the trajectory of the aircraft, and that can be adjusted by the user.

In the synthesis images according to the second type of perspective, clouds and storms cells are depicted in the form of a colored mass, preferably transparent.

Thus, the display in the synthesis images of objects representative of clouds or storm cells makes it possible to identify potential interferences of the cloud or storm cell with the trajectory of the aircraft, and to modify the trajectory of the aircraft in order to avoid them.

According to the first type of perspective, the apparent size of the objects depends on the distance between those objects and the point of view. Thus, the apparent size of these symbolic objects allows the user to see the distance of these objects, in particular the distance of the points, aircraft, clouds or storm cells depicted by these objects.

Preferably, when the distance between a symbolic object and the point of view is comprised between a predetermined minimum distance and a predetermined maximum distance, the apparent size of the symbolic object is a strictly decreasing function, for example linear, of the distance between the symbolic object and the point of view.

Furthermore, when the distance between the symbolic object and the point of view is smaller than the predetermined minimum distance, the apparent size of the object remains constant and equal to the apparent size that the symbolic object would have if the distance between the symbolic object and the point of view was equal to the predetermined minimum distance. Preferably, a transparency effect is also applied to the object. This makes it possible to prevent an object very close to the point of view from concealing the field of vision.

Furthermore, when the distance between the symbolic object and the point of view is larger than the predetermined maximum distance, the apparent size of the object remains constant and equal to the apparent size that the symbolic object would have if the distance between the symbolic object and the point of view was equal to the predetermined maximum distance. This makes it possible to keep any object situated in the field of vision visible, even if that object is very far from the point of view.

The predetermined minimum and maximum distances are for example configurable and can be modified by user.

Thus, the module 36 is configured to apply a resizing factor to each symbolic object as a function of its distance from the point of view. This resizing factor is representative of the actual size of the object relative to the environment.

When the distance between a symbolic object and the point of view is comprised between the predetermined minimum distance and the predetermined maximum distance, the resizing factor is equal to 1, which means that the object is depicted at its nominal size relative to the environment.

When the distance between the symbolic object and the point of view is smaller than the predetermined minimal distance, the resizing factor is less than 1, and is a strictly increasing function, for example linear, of the distance between the object and the point of view. Thus, when this distance decreases, the actual size of the object relative to the environment decreases.

When the distance between the symbolic object and the point of view is greater than the predetermined maximum distance, the resizing factor is greater than 1, and is a strictly increasing function, for example linear, of the distance between the object and the point of view. Thus, when this distance increases, the actual size of the object relative to the environment increases.

When the distance between the symbolic object and the point of view is smaller than the predetermined minimum distance or larger than the predetermined maximum distance, the resizing factor is for example equal to the ratio between the distance of the object from the point of view and the predetermined minimum or maximum distance, respectively.

The synthesis images are thus generated by the module 36 as a function of image parameters that in particular define:
the type of perspective of the image,
the position of the central point of interest Pc,
for images according to the first type of perspective, the position of the point of view Pv, in particular its observation distance Z from the central point of interest Pc, the horizontal angular position $a_h$ and the vertical angular position $a_v$, as well as the opening angles a1 and a2,
the scale of the image, which is defined, for images according to the first type of perspective, by the observation distance Z, and for images according to the second type of perspective, by the actual length A1 of the zone depicted in these images.

Preferably, according to the first type of perspective, not all positions of the point of view Pv are authorized. For example, the horizontal and vertical angular positions are each comprised in a predefined authorized angular range.

For example, the horizontal angular position $a_h$ is comprised between −90 degrees and 90 degrees, and the vertical angular position $a_v$ is comprised between −15 degrees and 90 degrees.

The indicated parameters may be defined by default.

In particular, the synthesis image may be seen by default according to the first type of perspective.

Furthermore, the horizontal opening angle is for example set by default to 90 degrees, the vertical opening angle then being adapted as a function of the length and width of the displayed image.

The vertical angular position $a_v$ can also be determined by default, for example at a value of 30 degrees.

Furthermore, the observation distance Z between the central point of interest Pc and the point of view Pv can be set by default, in particular such that a set of predetermined points, hereinafter called set of points of interest, can be completely included in the observation pyramid. The module 36 is furthermore configured to automatically determine an optimal position of the point of view Pv making it possible to optimize the trajectory portion displayed in the image.

In particular, a distance $Z_0$ between the point of view Pv and the central point of interest $Pc_0$ being fixed, and a vertical angular position $a_{v0}$ being fixed, the module 36 is configured to automatically determine a position of the point of view Pv, situated at the distance $Z_0$ from the central point of interest $Pc_0$ and situated at the vertical angular position $a_{v0}$ making it possible to maximize the actual length of the trajectory portion viewed in the image, the opening angles a1 and a2 remaining fixed.

Furthermore, the vertical angular position $a_{v0}$ is for example fixed at 30 degrees.

In order to determine an optimal horizontal angular position denoted $a_{hopt}$, the module 36 is configured to determine a set of successive points on the trajectory, denoted Pi, according to a predetermined sampling, from an initial point that for example corresponds to the position of the aircraft, preferably in the downstream direction of that trajectory. Indeed, the points of interest of the trajectory for an operator are generally those which have not yet been reached by the aircraft.

For example, the points Pi are regularly spaced apart on the trajectory.

The module 36 is further configured to determine an optimal vertical angular position making it possible to optimize the number of points Pi included in the viewing pyramid, the points Pi of the trajectory closest to the initial point having priority relative to the points Pi of the trajectory further from the initial point.

For example, the module 36 is configured to successively adjust the angular position, from a starting horizontal angular position $a_{h0}$, so as to successively include the points Pi in the viewing pyramid, while keeping all of the points of interest within the observation pyramid.

To that end, the module 36 is configured to iteratively carry out successive phases for determining a modified horizontal angular position $a_{hi}$ so as to successively include, in the observation pyramid, successive points of the trajectory Pi.

Thus, during the first of these iterative phases, the module 36 is configured to determine a first modified horizontal angular position $a_{h1}$. To that end, the module 36 is configured to determine a modified horizontal angular position such that the point $P_1$ is included in the observation pyramid, preferably so that the edge of the observation pyramid closest to the point $P_1$ before modification of the initial horizontal angular position $a_{h0}$ intersects the point $P_1$ when the horizontal position is equal to that modified horizontal angular position.

If this modified horizontal angular position is not comprised in the predefined authorized angular range for the horizontal position, for example not comprised between −90 degrees and 90 degrees, the module 36 is able to choose, as first modified horizontal angular position $a_{h1}$, the boundary of that authorized range closest to the modified horizontal angular position thus determined.

If the modified horizontal angular position is comprised in the second predefined authorized angular range for the horizontal angular position, the module 36 is able to choose this first modified angular position as first modified horizontal angular position $a_{h1}$.

Then, during the following phase, the module 36 is configured to determine a modified horizontal angular position $a_{hi}$. To that end, the module 36 is configured to determine a modified horizontal angular position such that the point $P_i$ is included in the observation pyramid, preferably so that the edge of the observation pyramid closest to the point $P_i$ before modification of the modified horizontal angular position $a_{hi-1}$ determined during the preceding iteration intersects the point $P_i$ when the horizontal angular position is equal to that modified horizontal angular position.

Likewise, if the modified horizontal angular position is not comprised in the predefined authorized angular range for the horizontal angular position, the module 36 is able to choose the boundary of this authorized range closest to the determined angular position as the new modified horizontal angular position $a_{hi}$.

If the modified horizontal angular position is comprised in the predefined authorized angular range for the horizontal angular position, the module 36 is able to choose this modified angular position as new modified horizontal angular position $a_{vi}$.

In each phase, the module 36 is configured to end the sequence of iterations if, during that iteration, it is not possible to find a horizontal angular position such that the considered point Pi of the trajectory is included in the observation pyramid without other points $P_1, \ldots P_{i-1}$ of the trajectory or points of the set of points of interest leaving the observation pyramid.

The optimal horizontal angular position $a_{hopt}$ is then chosen by the module 36 as the last determined modified angular position $a_{hi-1}$.

The image parameters can also be set by an operator, by actions to modify the displayed synthesis image performed via the man-machine interface 18.

Such modification actions are performed by an operator, through the man-machine interface 18.

These modification actions can in particular consist of an action to modify the perspective of the synthesis image, an action to modify the position of the point of view, an action to modify the central point of interest, or an action to modify the scale of the image, which corresponds, in the case of an image according to the first type of perspective, to a modification of the observation distance between the point of view and the central point of interest, or in the case of an image according to the second type of perspective, a modification of the actual size of the illustrated zone.

The module 36 is configured to detect such modification actions, and to generate modified synthesis images in response to such modification actions.

In order to facilitate the performance of some of these actions by an operator, the generating module 36 is able to superimpose, on the synthesis objects, one or more objects each associated with a specific modification action, and each indicating a zone of the image in which the modification action must be performed, as described below.

In particular, the module 36 is able to display, on each synthesis image, an icon 80 forming an activatable button, the actuation of which is intended to modify the central point of interest of the image, in order to use the current position of the aircraft as new central point of interest.

This actuation is done using the man-machine interface 18, for example by positioning a control member on the zone of the touchscreen 16 displaying the icon 80. The icon 80 is for example in the general shape of the aircraft.

The module 36 is configured to detect a modification action of the central point of interest, in order to go from an initial image centered on an initial central point of interest $Pc_0$ to a final image centered on a final modified central point of interest $Pc_n$.

The module 36 is configured to determine the final modified central point of interest $Pc_n$ as a function of the detected modification action. Furthermore, the module 36 is configured to generate a final modified synthesis image centered on the final modified central point of interest $Pc_n$ and to command the display thereof by the display device 14.

Preferably, the modification of the central point of interest is done without modifying the distance Z between the point of view and the central point of interest. Such a modification therefore generally also results in modifying the position of the point of view. The final modified synthesis image is then seen from a modified point of view $Pv_n$ different from the point of view $Pv_0$ of the initial image. Furthermore, this modification of the central point of interest is for example done without modifying the viewing angles $a_1$ and $a_2$.

Furthermore, the module 36 is configured to generate, at a plurality of successive transition moments, a transition image between the initial image and the final image, in order to display these successive transition images, then the final image. Each transition image generated at a given transition moment is centered on an intermediate central point of interest $Pc_i$ situated between the initial central point of interest $Pc_0$ and the final modified central point $Pc_n$ and seen from a modified point of view $Pv_i$ situated between the initial point of view $Pv_0$ and the final point of view $Pv_n$. The module 36 is further configured to control the successive display of the transition images at a plurality of moments between the display moment of the initial image and the display moment of the final image.

An action to modify the central point of interest may be of several types.

The first type of action to modify the central point of interest comprises actuating the icon 80, in order to center the synthesis image on the current position of the aircraft.

A second type of modification of the central point of interest consists of selecting any targeted point of the synthesis image via the man-machine interface 18, in order to choose that point as central point of interest. This selection is for example done by positioning a control member on the touchscreen 16 across from the targeted point.

The module 36 is configured to detect an action to modify the central point of interest of the first or second type and centered on the position of the aircraft or on the targeted point, to determine the final modified central point of interest $Pc_n$ as a function of the detected modification action, to generate a final modified synthesis image centered on the final modified central point of interest $Pc_n$ and to command the display thereof by the viewing device 14. Furthermore, as described above, the module 36 is configured to generate, at a plurality of successive transition moments, transition images, and to command the successive display of these transition images at a plurality of moments between the display moment of the initial image and the display moment of the final image.

A third type of action to modify the central point of interest comprises a movement of a member by an operator between an initial position and a final position.

For example, this member is a control member, and the third type of modification action of the central point of interest comprises a movement of this control member by an operator between an initial position and a final position on the touchscreen 16.

According to a first embodiment, such a movement is intended to cause a corresponding movement of the central point of interest on the synthesis image.

According to a second embodiment, such a movement is intended to drive a movement of the central point of interest on the synthesis image along the trajectory of the aircraft. According to the second embodiment, the central point of interest remains along the trajectory independently from the modification action, in particular from the movement of the member by the operator, in particular when this movement is done in a direction not parallel, therefore secant, to the tangent to the trajectory curve at the initial central point of interest.

The choice of the first or second mode may for example be made by an operator via the man-machine interface 18.

When the first or second mode is activated, the module 36 is configured to detect a movement of a member between an initial position and a final position, in particular a movement of the control member by an operator on the touch screen 16 between an initial position and a final position.

The module 36 is configured to detect, at each moment during this movement, an intermediate position of the member comprised between its initial position and its final position, as well as an intermediate movement vector between the initial position and the intermediate position. At the end of the movement of the member by the operator, the module 36 is configured to determine a final movement vector of the member between its initial position and its final position.

When the first mode is activated, the module 36 is configured to determine, at each moment, during the movement of the member, a translation vector for the central point of interest as a function of the movement of the member between its initial position and its intermediate position at that moment and to determine an intermediate modified central point of interest $Pc_i$, by applying the movement vector to the initial central point of interest $Pc_0$.

For example, the translation vector for the central point of interest is determined at each moment as a component in a horizontal plane of the synthesis image of the movement vector of the member between its initial position and its intermediate position.

The module 36 is further configured to determine a final translation vector for the central point of interest as a function of the final movement vector and to determine a final modified central point of interest $Pc_n$, by applying the final movement vector to the initial central point of interest $Pc_0$.

The final translation vector is for example determined as the component in a horizontal plane of the synthesis image of the final movement vector of the member between its initial position and its final position.

When the second mode is activated, the synthesis image is centered by default on a central point of interest situated along the curve 44 representative of the trajectory of the aircraft. The initial central point of interest is therefore situated along this trajectory curve.

When the second mode is activated, the module 36 is configured to determine, at each moment, during the movement of the member, an intermediate modified central point of interest Pc, that is situated along the curve representative of the trajectory of the aircraft, irrespective of the movement of the member between its initial position and its intermediate position.

Furthermore, the module 36 is configured to determine, as a function of the modification action, a final modified central point of interest that is situated along the curve representative of the trajectory of the aircraft, irrespective of the movement of the member between its initial position and its final position.

The second mode thus allows an operator to modify the central point of interest while remaining along the trajectory of the aircraft, and thus to view the terrain situated along that trajectory, without it being necessary for the operator to move the member in a direction corresponding, at each moment, to the direction of the trajectory.

In particular, the module 36 is configured to determine, at each moment during the modification action, from the movement vector of the member between its initial position and its intermediate position, the component of that vector in a horizontal plane of the synthesis image. The module 36 is further configured to determine, at each moment, from this horizontal component, a curvilinear distance on the trajectory curve between the initial central point of interest $Pc_0$ and an intermediate modified central point of interest $Pc_i$, then to determine an intermediate modified central point of interest $Pc_i$ by applying, to the initial central point of interest $Pc_0$, a movement along the trajectory curve 44 by a length equal to the curvilinear distance thus determined.

For example, the curvilinear distance is determined as a function of the horizontal component of the movement vector and a vector tangent to the curve at the initial central point of interest, in particular as a function of a scalar product between the horizontal component and the tangent vector.

At the end of the movement of the member by the operator, the module 36 is configured to determine, from the final movement vector of the member between its initial position and its final position, the component of this final movement vector in a horizontal plane of the synthesis image. The module 36 is further configured to determine, from this horizontal component, a curvilinear distance on the trajectory curve between the initial central point of interest $Pc_0$ and the final modified central point of interest $Pc_n$, then to determine the final modified central point of interest $Pc_n$ by applying, to the initial central point of interest, a movement along the trajectory curve by a length equal to the curvilinear distance thus determined.

According to the first and second modes, the module 36 is configured to generate, at each moment, an intermediate modified synthesis image centered on the intermediate modified central point of interest $Pc_i$ determined at that moment and to command the display thereof by the display device 14. The module 36 is also configured to generate, at the end of the movement, a final modified synthesis image centered on the final modified central point of interest $Pc_n$ and to command the display thereof by the display device 14.

Preferably, at the end of the movement of the member by the operator, the module 36 is configured to virtually extend this movement in order to add an inertia effect to the movement of the member by the operator. The module 36 is thus configured to determine one or more additional modified synthesis images intended to be displayed after the final modified synthesis image, each centered on an additional modified central point of interest determined based on a virtual movement beyond the actual final position of the member at the end of its movement.

The generating module 36 is further configured to display, in the synthesis images according to the first type of perspective, an icon 82 forming a vertical slide or an icon 84 forming a horizontal slide.

The vertical slide 82 is associated with an action to modify the viewing angle in a vertical plane, i.e., an action to modify the position of the point of view of the image, this modification being a rotation of the point of view relative to the central point of interest in the vertical plane containing the initial point of view and the central point of interest, i.e., a modification of the vertical angular position $a_v$ of the point of view.

This action to modify the vertical angular position $a_v$ is done using the man-machine interface 18, for example by moving a control member over the zone of the touchscreen 16 displaying the vertical slide 82 from top to bottom or from bottom to top along the vertical slide 82.

In particular, a movement from top to bottom along the vertical slide 82 can cause a rotation of the position of the point of view toward the bottom of the image, while a movement from bottom to top along the vertical slide 82 is able to cause a rotation of the position of the point of view toward the top of the image.

The vertical slide 82 extends substantially vertically in the synthesis image between an upper stop 82a and a lower stop 82b, which are for example associated with the boundaries of the range authorized for the vertical angular position $a_v$. For example, the upper stop 82a is associated with a vertical angular position $a_v$ of 90 degrees, while the lower stop 82b is associated with a vertical angular position $a_v$ of −15 degrees.

The horizontal slide 84 is associated with an action to modify the viewing angle in a horizontal plane, i.e., an action to modify the position of the point of view of the image, this modification being a rotation of the point of view relative to the central point of interest in the horizontal plane containing the initial point of view and the central point of interest, i.e., a modification of the horizontal angular position $a_h$ of the point of view.

This action to modify the horizontal angular position $a_h$ is done using the man-machine interface 18, for example by moving a control member over the zone of the touchscreen 16 displaying the horizontal slide 84 from left to right or from right to left along the horizontal slide 84.

In particular, a movement from left to right along the horizontal slide 84 can cause a rotation of the position of the point of view in the counterclockwise direction, while a movement from right to left along the horizontal slide 84 can cause a rotation of the position of the point of view in the clockwise position.

The horizontal slide 84 extends substantially horizontally over the synthesis image between a left stop 84a and a right stop 84b, which are for example associated with the boundaries of the range authorized for the horizontal angular position $a_h$. For example, the left stop 84a is associated with a horizontal angular position $a_h$ of −90 degrees, while the right stop 84*b* is associated with a horizontal angular position $a_h$ of 90 degrees.

Preferably, when no control member is positioned on the touchscreen 16 in the zone displaying the slide 82, the slides 82 and 84 are displayed transparently only. This makes it possible to avoid overloading the synthesis images with the slides 82 and 84 when their display is not necessary.

Furthermore, as long as a positioning of a control member on the touchscreen 16 in the zone displaying the vertical slide 82 or horizontal slide 84 is detected, the module 36 is able to superimpose, on the vertical 82 or horizontal 84 slide, respectively, a marker indicating the current position of the control member on the zone displaying the slide 82 or 84. This marker is for example a horizontal or vertical line intersecting the vertical 82 or horizontal 84 slide, respectively.

The vertical 82 and horizontal 84 slides are each associated with a predetermined rotation scale. In particular, a given position along the vertical slide 82, along the horizontal slide 84, respectively, is associated with a given vertical angular position $a_v$, a given horizontal angular position $a_h$, respectively.

The module 36 is configured to detect an action to modify the viewing angle in a horizontal or vertical plane, and to determine in real time, at each moment during this movement, a modified horizontal or vertical angular position as a function of the position of the member on the slide 82 or 84. The module 36 is further configured to determine a modified point of view at the horizontal or vertical angular position as modified, and to generate a modified synthesis image seen from the modified point of view thus determined.

The module 36 is further configured to detect an action to modify the scale of the image.

A scale modification action corresponds, for the images according to the first type of perspective, to a modification of the observation distance Z between the point of view Pv and the central point of interest Pc. For the images according to the second type of perspective, a scale modification action corresponds to a modification of the actual size of the depicted zone, i.e., a modification of the length A1 and consequently of the width A2 of the depicted zone.

In particular, an action to increase the scale of the synthesis image corresponds, for the images according to the first type of perspective, to a decrease in the observation distance Z, and for the images according to the second type of perspective, to a decrease in the length A1 and width A2 of the illustrated zone.

Conversely, an action to reduce the scale of the synthesis image corresponds, for the images according to the first type of perspective, to an increase of the observation distance Z, and for the images according to the second type of perspective, to an increase of the length A1 and width A2 of the depicted zone.

The module 36 is further configured to generate, in response to such a modification action, modified synthesis images, and to command the display of these modified synthesis images on the display device 14.

A scale modification action is performed by a user using the man-machine interface 18. In particular, such a modification action comprises a movement of two control members on the touchscreen 16 in two substantially opposite directions, which can be followed by maintenance of the two control members on the touchscreen 16 at the end of their movement.

The module 36 is configured to detect the position, at an initial moment, of two control members on the touchscreen 16 in two initial positions associated with two distinct initial points $P_1$ and $P_2$, and determine, when this positioning is detected, a midpoint $P_m$ situated midway between these two initial points, as well as a first zone 98, a second zone 100 and a third zone 102 centered on this midpoint.

Figure 7:
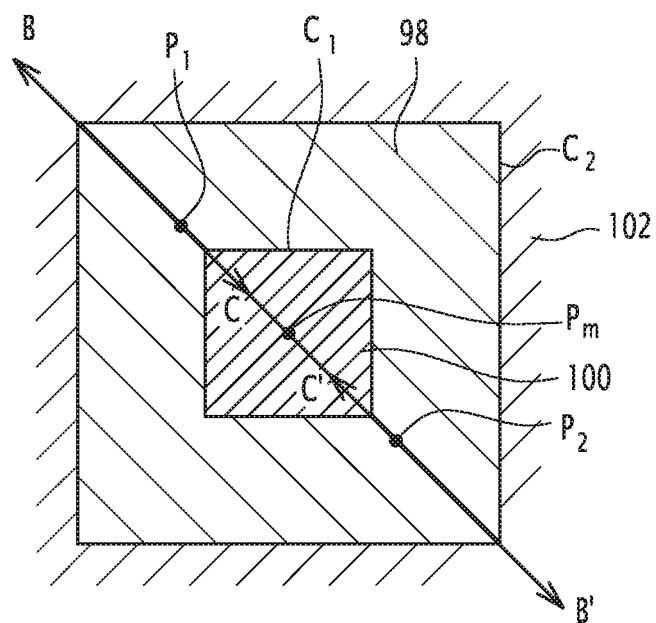
FIG. 7 is a diagram illustrating the definition of zones on a monitor of the system of FIG. 1 during a modification of the scale of the synthesis image.

As illustrated in FIG. 7, the first, second and third zones 98, 100, 102 are defined by two closed curves $C_1$, $C_2$ centered on the midpoint P.

In the illustrated example, the two closed curves $C_1$, $C_2$ are each in the shape of a square whereof one of the diagonals passes through the two initial points $P_1$ and $P_2$. Alternatively, the two curves $C_1$, $C_2$ are polygonal, round or oval, or have any curved shape. Each of these curves $C_1$, $C_2$ defines a set of points situated inside these curves. The two initial points $P_1$ and $P_2$ are comprised in the set of points defined by the second curve $C_2$, but not comprised in the set of points defined by the first curve $C_1$.

The first zone 98, which includes the initial points $P_1$ and $P_2$, is formed by the set of points contained between the first curve $C_1$ and the second curve $C_2$.

The second zone 100 is formed by the set of points contained inside the second curve $C_2$. This second zone 100 is associated with a scale reduction action, as described below.

The third zone 102 is formed by points situated outside the curves $C_1$ and $C_2$. This third zone 102 is associated with a scale increase action, as described below.

A scale increase action of the synthesis image comprises a movement of the two control members on the touchscreen 16 following a substantially rectilinear trajectory in two substantially opposite directions away from one another, optionally followed by maintenance of the two control members on the touchscreen 16 following their movement.

In reference to FIG. 7, such a scale increase action comprises a movement of two control members from the initial points $P_1$ and $P_2$ in two opposite directions B, B' away from the midpoint $P_m$. A scale increase action therefore corresponds to an increase in the distance d between the two members.

A scale decrease action of the synthesis image comprises a movement of the two members on the touchscreen 16 following a substantially rectilinear trajectory in two substantially opposite directions toward one another, optionally followed by maintenance of the two control members on the touchscreen 16 following their movement.

In reference to FIG. 7, such a scale decrease action comprises a movement of two control members from the initial points $P_1$ and $P_2$ in two opposite directions C, C' toward the midpoint $P_m$. A scale decrease action therefore corresponds to a decrease in the distance d between the two control members.

The module 36 is able to detect the movements of the two control members and to determine, at each moment, as a function of the position of these control members, a resizing factor of the initial image, hereinafter called scale modification factor of the image.

This scale modification factor, denoted γ, is defined as a multiplicative factor designed to be applied to a perimeter of the initial image in order to determine a modified parameter associated with a modified scale.

For example, for the synthesis images according to the first type of perspective, a scale multiplication by the factor γ corresponds to a multiplication of the observation distance γ of the factor γ to determine a modified observation distance.

For the synthesis images according to the second type of perspective, a multiplication of the scale by the factor γ corresponds to a multiplication of the length $A_1$ and the width $A_2$ of the zone depicted by the image by a factor $\gamma$.

During a scale decrease, the scale modification factor is strictly greater than 1.

During a scale increase, the scale modification factor is strictly comprised between 0 and 1.

The module 36 is configured to determine, at each moment, denoted ti, the scale modification factor $\gamma_i$ as a function of the position of the control members relative to the first zone 98.

In particular, the module 36 is configured to determine the scale modification factor according to a first computation mode while the control members remain positioned on the touchscreen 16 across from points situated inside the first zone 98, and to determine the positioning factor according to a second computation mode when the control members are positioned on the touchscreen 16 across from points situated outside the first zone 98, i.e., inside the second zone 100 or the third zone 102.

While the control members remain positioned on the touchscreen 16 across from points situated inside the first zone 98, the module 36 determines, at each moment, the scale modification factor $\gamma_i$ as a function of the distance between these control members at that moment and the distance between the initial points $P_1$ and $P_2$. Preferably, the scale modification factor $\gamma_i$ is a strictly decreasing function of the distance $d_i$ between the control members, for example a linear function of the deviation or the ratio between the distance d0 between the initial points $P_1$ and $P_2$ and the distance $d_i$ between the control members at that moment.

As an example, the scale modification factor $\gamma_i$ is determined according to a formula of the type:

$$\gamma_i = k \frac{d_0}{d_i},$$

where k is a strictly positive proportionality factor.

When the control members are positioned on the touchscreen 16 across from points situated outside the first zone 98, the module 36 determines, at each moment t'i, the scale modification factor, denoted $\gamma'_i$, as a function of the maintenance duration of the control members outside the first zone 98. This maintenance duration, denoted Ti, corresponds to the length of time elapsed between the moment denoted $t'_0$ at which one or two control members have reached the boundaries of the first zone 98 and the moment t'i under consideration.

Preferably, as long as the control members are positioned on the touchscreen 16 across from points situated outside the first zone 98, the scale modification factor $\gamma'_i$ is independent of the position of the points of the screen situated across from these control members.

At the moment $t'_0$, the scale modification factor $\gamma'_0$ is equal to the scale modification factor determined according to the first computation mode.

The scale modification factor is then a strictly monotonous function of the maintenance duration Ti.

In particular, if the control members are positioned on the touchscreen 16 across from points situated inside the second zone 100, the scale modification factor is a strictly increasing function of the maintenance duration Ti.

Conversely, if the control members are positioned on the touchscreen 16 across from points situated inside the third zone 102, the scale modification factor is a strictly decreasing function of the maintenance duration Ti.

Thus, when the control members are situated in the second zone 100 or in the third zone 102, the mere maintenance of the control members on the touchscreen 16 makes it possible to continue the scale decrease or increase action, respectively. It is thus possible for a user to resize the zone depicted by the image by the desired scale modification factor without it being necessary, due to the finite dimensions of the touchscreen 16, to perform several successive modification actions.

Preferably, the absolute value of the drift of the scale modification factor $\gamma'_i$ is an increasing function over time, which means that the scale change occurs more and more quickly when the maintenance duration Ti increases. This in particular makes it possible to go quickly from the city scale to the country or continent scale, or conversely to go quickly from the continent scale to the country or city scale, in a single gesture.

In particular, when the control members are positioned on the touchscreen 16 across from points situated in the second zone 100, the scale modification factor $\gamma'_i$ is a convex function, in particular strictly convex, of the maintenance duration Ti. For example, the scale modification factor $\gamma'_i$ increases exponentially when the maintenance duration Ti increases. According to another example, the scale modification factor $\gamma'_i$ is a piecewise affine function, the slope of the affine function, which is positive, increasing when the maintenance duration Ti increases.

When the control members are positioned on the touchscreen 16 across from points situated in the third zone 102, the scale modification factor $\gamma'_i$ is a concave function, in particular strictly concave, of the maintenance time Ti. For example, the scale modification factor $\gamma'_i$ decreases exponentially when the maintenance duration Ti increases. According to another example, the scale modification factor $\gamma'_i$ is a piecewise affine function, the slope of the affine function, which is negative, decreasing when the maintenance duration Ti increases.

As indicated above, the module 36 is configured to detect a scale modification action and to determine, at each of a plurality of successive moments during such an action, a scale modification factor $\gamma_i$ or $\gamma'_i$.

Preferably, a minimum scale modification factor and a maximum scale modification factor are predetermined. When the scale modification factor $\gamma_i$ or $\gamma'_i$ reaches the minimum or maximum scale modification factor, the scale modification factor $\gamma_i$ or $\gamma'_i$ remains equal to the minimum or maximum scale modification factor, respectively, even if the distance $d_i$ between the control members increases or decreases respectively, and even if the control members remain positioned on the touchscreen 16 across from points situated in the second or third zone.

Furthermore, the module 36 is configured to apply, at each of the successive moments, the scale modification factor $\gamma_i$ or $\gamma'_i$ determined at that moment to the scale of the initial synthesis image to determine a modified scale.

In particular, according to the second type of perspective, a multiplication of the scale of the initial image by the scale modification factor corresponds to a multiplication of the length A1 and the width A2 of the zone depicted by the image by a factor $\gamma$. According to the first type of perspective, a multiplication of the scale of the initial image by the scale modification factor corresponds, with a fixed opening angle, to a modification of the distance Z between the point of view and the central point of interest by the factor $\gamma$.

The module 36 is further configured to generate, at each of these moments, a modified image with a modified scale thus determined, and to command the display thereof on the display device 14.

Preferably, when the modification action corresponds to a scale increase, the modified image has the midpoint $P_m$ as central point of interest. Alternatively, the modified image keeps the same central point of interest as the initial image.

Likewise, when the modification action corresponds to a scale decrease, the modified image for example has the midpoint $P_m$ as central point of interest. Alternatively, the modified image keeps the same central point of interest as the initial image.

Once the control members are no longer positioned on the touchscreen 16, the scale modification action of the synthesis image stops.

Preferably, the module 36 is configured to compare the dimensions $A_{1n}$ and $A_{2n}$ or the distance $Z_n$ associated with the last generated modified image to predetermined dimension or distance threshold, and to determine the dimension thresholds, the distance threshold, respectively, closest to the dimensions $A_{1n}$ and $A_{2n}$ or the distance $Z_n$.

The module 36 is further configured to generate a final modified image depicting a zone whereof the dimensions correspond to the closest determined dimension thresholds and/or a distance Z equal to the determined distance threshold, and to command the display thereof on the display device 14. Thus, the observation distance Z or the dimensions of the depicted zone to magnetize themselves over an observation distance or predefined dimensions.

The module 36 is further configured to detect a modification action of the image type of perspective, for example, an action to go from an image according to the first type of perspective to an image according to the second type of perspective, in particular seen from above or seen from the side, or an action to go from an image according to the second type of perspective to an image according to the first type of perspective. The passage from an image according to the first type of perspective to an image according to the second type of perspective is for example desirable when the operator, for example the pilot, wishes to modify the flight plan, in particular one or several passage points of the flight plan. A view according to the second type of perspective, from above or the side, is in fact more appropriate for such a modification than a view according to the first type of perspective.

This modification action is done using the man-machine interface 18, for example by actuating a dedicated icon superimposed on the synthesis image by the module 36.

According to one example, an action to go from a synthesis image according to the first type of perspective to a synthesis image according to the second type of perspective seen from above comprises a movement of the control member over the zone of the touchscreen 16 displaying the vertical slide 82 from bottom to top along that vertical slide 82 up to the upper stop 82a.

According to this example, the synthesis image according the first type of perspective, hereinafter called initial synthesis image, from which the transition toward the synthesis image according to the second type of perspective is done, is preferably seen from a point of view having a vertical angular position equal to 90 degrees. This is therefore an image according to the first type of perspective seen from above.

The module 36 is configured to detect a modification action aiming to go from a synthesis image according to the first type of perspective to a synthesis image according to the second type of perspective or from a synthesis image according to the second type of perspective to a synthesis image according to the first type of perspective, and to generate, in response to such an action, a plurality of successive three-dimensional transition images between the synthesis image according the first type of perspective and the synthesis image according to the second type of perspective or between the synthesis image according to the second type of perspective and the synthesis image according the first type of perspective, respectively.

The transition images are synthesis images according to the first type of perspective.

The image according to the second type of perspective is for example an image seen from above.

The transition images are intended to be displayed on the display device 14 at a plurality of successive transition moments, between an initial display moment of the synthesis image according to the first type of perspective or according to the second type of perspective, respectively, and a final display moment of the synthesis image according to the second type of perspective or according to the first type of perspective, respectively.

The transition images are intended to ensure a continuous and fluid transition between the synthesis image according to the first type of perspective and the synthesis image according to the second type of perspective or between the synthesis image according to the second type of perspective and the synthesis image according to the first type of perspective, respectively.

Each transition image is centered around a central point of interest Pci, hereinafter called intermediate central point of interest, is seen from a point of view Pvi hereinafter called intermediate point of view, the observation distance Zi between this intermediate point of view and the intermediate central point of interest being called intermediate observation distance, and is seen from an intermediate horizontal opening angle a1i and a vertical intermediate opening angle a2i.

Each transition image shows a zone of the environment with length A1i, called intermediate length, and width A2i, called intermediate width, the ratio between the intermediate length A1i and the intermediate width A2i remaining constant and equal to the ratio between the length A1 and the width A2 of the three-dimensional synthesis image. The horizontal a1i and vertical a2i intermediate opening angles being linked to one another as a function of the ratio between the intermediate length A1i and the intermediate width A2i that remains constant, "opening angle" will hereinafter generally refer to one or the other of these opening angles, for example the intermediate horizontal opening angle a1i.

During a transition between the initial synthesis image according to the first type of perspective and a final synthesis image according to the second type of perspective, the module 36 is configured to generate three-dimensional transition images according to the first type of perspective by decreasing, from one transition image to the next, the opening angle a1i, and increasing, from one transition image to the next, the observation distance Zi, such that the length A1i of the zone represented by each transition image remains comprised in a predefined bounded interval around the length A1 of the zone shown by the initial synthesis image. The initial synthesis image can itself be considered a transition image.

The decrease of the opening angle a1i from one transition image to the next makes it possible to achieve a fluid transition between the synthesis image according the first type of perspective and the synthesis image according to the second type of perspective. In particular, the visual gap between a three-dimensional image according to the first type of perspective seen with a very small opening angle a1$i$, for example 5°, and the corresponding image according to the second type of perspective is practically imperceptible.

Furthermore, the increase in the observation distance Zi makes it possible to keep a zone length depicted by the transition images substantially identical to the length of the zone represented by the initial synthesis image and therefore contributes to providing a fluid transition between the initial synthesis image according to the first type of perspective and the final synthesis image according to the second type of perspective.

The module 36 is thus configured to determine, for each transition image, the intermediate opening angle a1$i$ and the intermediate observation distance Zi of that transition image.

The intermediate opening angle a1$i$ of each transition image is smaller than the opening angle a1 of the initial synthesis image and the intermediate opening angle of any preceding transition image.

The opening angle a1$i$ of each transition image is thus a decreasing fraction of the transition moment at which that transition image is intended to be displayed.

"Decreasing function" refers to a non-constant decreasing function, i.e., as at least one first and one second successive transition moment exist, the second transition moment ti being after the first transition moment $t_{i-1}$, such that the intermediate opening angle $a1_{i-1}$ of a first transition image intended to be displayed at the first moment is strictly smaller than the intermediate opening angle a1$i$ of a second transition image intended to be displayed at the second transition moment.

The intermediate opening angle a1$i$ of each transition image is preferably strictly smaller than the opening angle a1 of the initial synthesis image and the intermediate opening angle of any preceding transition image.

The opening angle a1$i$ of each transition image is then a strictly decreasing function of the transition moment at which that transition image is intended to be displayed.

For example, the opening angle of the initial synthesis image is comprised between 30° and 140°, in particular equal to 90°, and the intermediate opening angle of the last transition image is smaller than 10°, for example comprised between 0.1° and 10°, for example substantially equal to 5°.

The intermediate observation distance Zi of each transition image is greater than the observation distance Z of the initial synthesis image and the intermediate observation distance of any preceding transition image.

The intermediate observation distance Zi of each transition image is thus an increasing function of the transition moment at which that transition image is intended to be displayed.

"Increasing function" refers to a non-constant increasing function, i.e., as at least one first and one second successive transition moment exist, the second transition moment ti being after the first transition moment $t_{i-1}$, such that the intermediate observation distance $Z_{i-1}$ of a first transition image intended to be displayed at the first moment is strictly greater than the intermediate observation distance Zi of a second transition image intended to be displayed at the second transition moment.

The intermediate observation distance Zi of each transition image is preferably strictly greater than the observation distance Z of the initial synthesis image and the intermediate observation distance of any preceding transition image.

The intermediate observation distance Zi of each transition image is then a strictly increasing function of the transition moment at which that transition image is intended to be displayed.

For example, the observation distance of the initial synthesis image is equal to 100 m, and the observation distance of the last transition image is substantially equal to 1600 km.

Preferably, the intermediate observation distance Zi of each transition image is a non-linear increasing function, in particular convex, of the transition moment at which that transition image is intended to be displayed.

In particular, such a convex function makes it possible to make the transition between the initial image and the final image more fluid.

Figure 8:
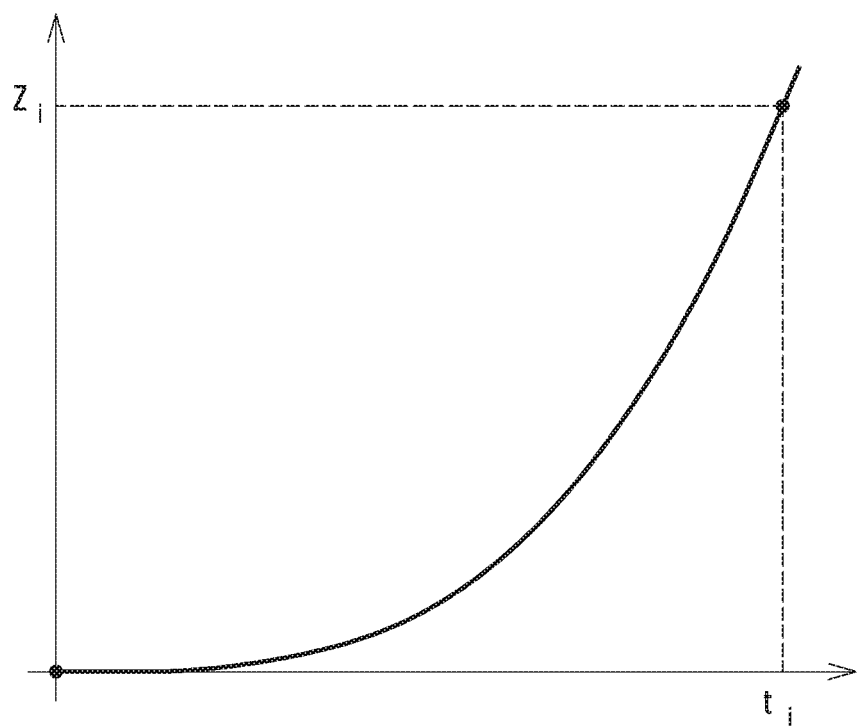
FIGS. 8 and 9 illustrate examples of functions used by the viewing system of FIG. 1 during a transition from an image according to the first type of perspective to an image according to the second type of perspective.

FIG. 8 shows an example function linking the transition moment ti, on the x-axis, to the intermediate observation distance Zi, on the y-axis, the scales on the x-axis and y-axis being normalized between 0 and 1.

Furthermore, the module 36 is preferably configured to determine the intermediate opening angle a1$i$ of each transition image as a function of the intermediate observation distance Zi determined for that transition image.

Preferably, the intermediate opening angle a1$i$ of each transition image is a nonlinear decreasing function of the transition moment ti at which that transition image is intended to be displayed.

In particular, the intermediate opening angle a1$i$ of a transition image is determined as a function of the intermediate observation distance Zi such that the length of the zone depicted by the transition image is comprised in a predetermined bounded interval around the length A1 of the zone depicted by the initial synthesis image.

For example, the intermediate opening angle a1$i$ of each transition image is determined as a function of the opening angle a1 of the initial synthesis image, a virtual opening angle a1'$i$ and the transition moment ti at which the transition image is intended to be displayed.

The virtual opening angle a1'$i$ is such that the length of the zone depicted in a virtual image seen from an observation distance equal to the intermediate observation distance Zi of the transition image and seen with that virtual opening angle a1'$i$ would be equal to the length A1 of the zone depicted by the initial synthesis image.

The virtual opening angle a1'$i$ is thus equal to:

$$a1'_i = 2 * \arctan\left(\frac{A1}{2Z_i}\right)$$

Preferably, the intermediate opening angle a1$i$ of each transition image is determined as a weighted average between the opening angle a1 of the initial synthesis image and the virtual opening angle a1'$i$, the weight coefficients of which vary as a function of the transition moment ti at which the transition image is intended to be displayed.

In particular, the intermediate opening angle a1$i$ of each transition image is determined according to a function of the type:

$$a1_i = (1-Y)*a1 + Y*a1'_j$$

where Y, which varies between 0 and 1, is an increasing function of the transition moment ti at which the transition image is intended to be displayed.

Figure 9:
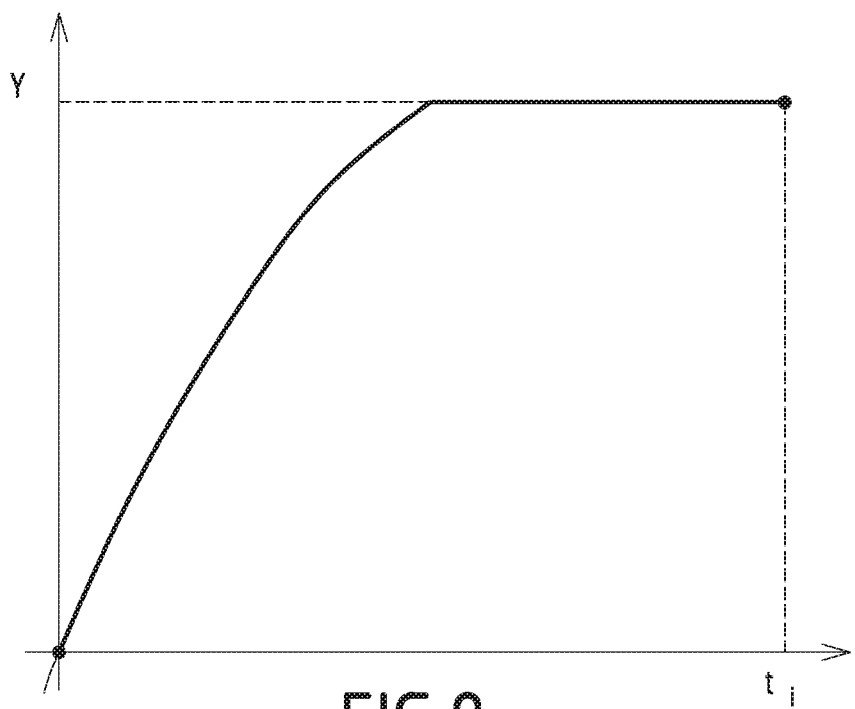

FIG. 9 shows an example function linking the transition moment ti, on the x-axis, to the coefficient Y, on the y-axis, the scale on the x-axis being normalized between 0 and 1.

According to this example, the coefficient Y has a strictly increasing value between a first transition moment t1 and a median transition moment ti at which the coefficient Y assumes the value 1 and then remains constant.

Such a determination of the intermediate opening angle a1$i$ and the observation distance Di of each intermediate image makes it possible to obtain a fluid transition between the initial synthesis image and the final synthesis image.

The module 36 is also configured to generate a plurality of transition images between the initial synthesis image and the final synthesis image, each transition image being seen from the intermediate opening angle a1$i$ and the intermediate observation distance Zi determined for that transition image.

The module 36 is further configured to control the successive display by the display device 14 of these transition images at the successive transition moments ti, then to command the display by the display device 14 of the final synthesis image, according to the second type of perspective.

Similarly, during a transition between the initial synthesis image according to the second type of perspective and a final synthesis image according to the first type of perspective, the module 36 is configured to generate three-dimensional transition images according to the first type of perspective by increasing, from one transition image to the next, the opening angle a1$i$, and decreasing, from one transition image to the next, the observation distance Zi, such that the length A1$i$ of the zone represented by each transition image remains comprised in a bounded interval around the length A1 of the zone shown by the final synthesis image. The final synthesis image may itself be considered a transition image.

The gradual increase of the opening angle a1$i$ from one transition image to the next makes it possible to produce a fluid transition between the synthesis image according to the second type of perspective and the synthesis image according to the first type of perspective. Furthermore, the gradual decrease of the observation distance Zi makes it possible to keep a zone length depicted by the transition images substantially equal to the length of the zone intended to be depicted by the final synthesis image, and therefore contributes to providing a fluid transition between the initial synthesis image and the final synthesis image.

The module 36 is thus configured to generate a first transition image, seen from a first intermediate opening angle a11 and with a first intermediate observation distance Z1. The first intermediate opening angle is for example smaller than 10°, in particular equal to 5°. The first intermediate observation distance is for example equal to 1600 km.

The module 36 is further configured to generate a plurality of additional transition images, each seen from an intermediate opening angle a1$i$ and an intermediate observation distance Zi.

The intermediate opening angle a1$i$ of each transition image is larger than the intermediate opening angle of any previous transition image.

The intermediate opening angle a1$i$ of each transition image is thus an increasing function of the transition moment at which that transition image is intended to be displayed.

"Increasing function" refers to a non-constant increasing function, as at least one first and one second successive transition moment exist, the second transition moment ti being after the first transition moment $t_{i-1}$, such that the intermediate opening angle $a1_{i-1}$ of a first transition image intended to be displayed at the first moment is strictly larger than the intermediate opening angle a1$i$ of a second transition image intended to be displayed at the second transition moment.

The intermediate opening angle a1$i$ of each transition image is preferably a strictly increasing function of the transition moment at which that transition image is intended to be displayed.

The intermediate opening angle a1$i$ of each transition image is thus strictly larger than the intermediate opening angle of any previous transition image.

For example, the intermediate opening angle of the last transition image is substantially equal to 90°.

The intermediate observation distance Zi of each transition image is smaller than the intermediate observation distance of any preceding transition image.

The intermediate observation distance Zi of each transition image is thus a decreasing function of the transition moment at which that transition image is intended to be displayed.

"Decreasing function" refers to a non-constant decreasing function, as at least one first and one second successive transition moment exist, the second transition moment ti being after the first transition moment $t_{i-1}$, such that the intermediate opening angle $a1_{i-1}$ of a first transition image intended to be displayed at the first moment is strictly smaller than the intermediate opening angle a1$i$ of a second transition image intended to be displayed at the second transition moment.

The intermediate observation distance Zi of each transition image is preferably strictly smaller than the intermediate observation distance of any preceding transition image.

The intermediate observation distance Zi of each transition image is then a strictly decreasing function of the transition moment at which that transition image is intended to be displayed.

For example, the observation distance of the last transition image is substantially equal to 100 m.

Preferably, the intermediate observation distance Zi of each transition image is a non-linear decreasing function, in particular convex, of the transition moment at which that transition image is intended to be displayed.

For example, the intermediate observation distance Zi is determined according to a function symmetrical to that used during a transition between a synthesis image according to the first type of perspective and a synthesis image according to the second type of perspective, as illustrated in FIG. 8.

Furthermore, the module 36 is preferably configured to determine the intermediate opening angle a1$i$ of each transition image as a function of the intermediate observation distance Zi determined for that transition image.

Preferably, the intermediate opening angle a1$i$ of each transition image is a nonlinear increasing function of the transition moment ti at which that transition image is intended to be displayed.

In particular, the intermediate opening angle a1$i$ of a transition image is determined as a function of the intermediate distance Zi such that the length of the zone depicted by the transition image is comprised in a predetermined bounded interval around the length A1 of the zone depicted by the final synthesis image.

For example, the intermediate opening angle a1$i$ of each transition image is determined as a function of the opening angle a1 of the final synthesis image, the virtual opening angle a1'$i$ and the transition moment ti at which the transition image is intended to be displayed.

Preferably, the intermediate opening angle a1$i$ of each transition image is determined as a weighted average between the opening angle a1 of the final synthesis image and the virtual opening angle a1'i, the weight coefficients of which vary as a function of the transition moment ti at which the transition image is intended to be displayed.

In particular, the intermediate opening angle a1i of each transition image is determined according to a function of the type:

$$a1_i=(1-Y')*a1+Y'*a1'_i$$

where Y, which varies between 0 and 1, is a decreasing function of the transition moment ti at which the transition image is intended to be displayed. For example, Y' is such that:

$$Y'(t_i)=Y(t_n-t_i),$$

where Y is the function defined above, for example as illustrated in FIG. 9.

The module 36 is further configured to control the successive display by the display device 14 of these transition images at the successive transition moments ti, then to command the display by the display device 14 of the final synthesis image, according to the first type of perspective.

To generate a synthesis image according to the first perspective, the module 36 associates each pixel of the three-dimensional environment with a depth attribute, representative of the altitude of that pixel relative to a horizontal reference plane. Such an attribute in fact makes it possible for the module 36 only to display the objects not hidden by other objects on the synthesis image. The depth is included over a predetermined number of bits, independent of the observation distance.

Such encoding can cause a loss of precision of the encoding of the depth during the display of images seen from a point of view very far from the central point of interest, and cause visual artifacts, in particular blinking effects, the module 36 no longer being able to determine which pixel must be displayed on the screen due to this drop in precision. Such an effect could in particular occur during a transition between an image according to the first type of perspective and an image according to the second type of perspective or during a transition between an image according to the second type of perspective and an image according to the first type of perspective.

To avoid such an effect, the module 36 is configured to associate a depth attribute only with the pixels situated in a predefined zone, in particular when the observation distance is greater than a predetermined observation distance. This predefined zone is defined as the set of pixels situated at an altitude below a maximum predetermined altitude, and preferably above a predefined minimum altitude.

The maximum altitude is for example equal to 20 km. The minimum altitude is for example defined as the altitude of the terrain.

Thus, for the pixels situated in the predefined zone, which is the only zone in which objects of interest may be found, the encoding of the depth remains sufficiently precise to avoid the appearance of visual artifacts, even when the observation distance becomes very large, in particular when the point of view is situated at an altitude above the maximum altitude.

Figure 10:
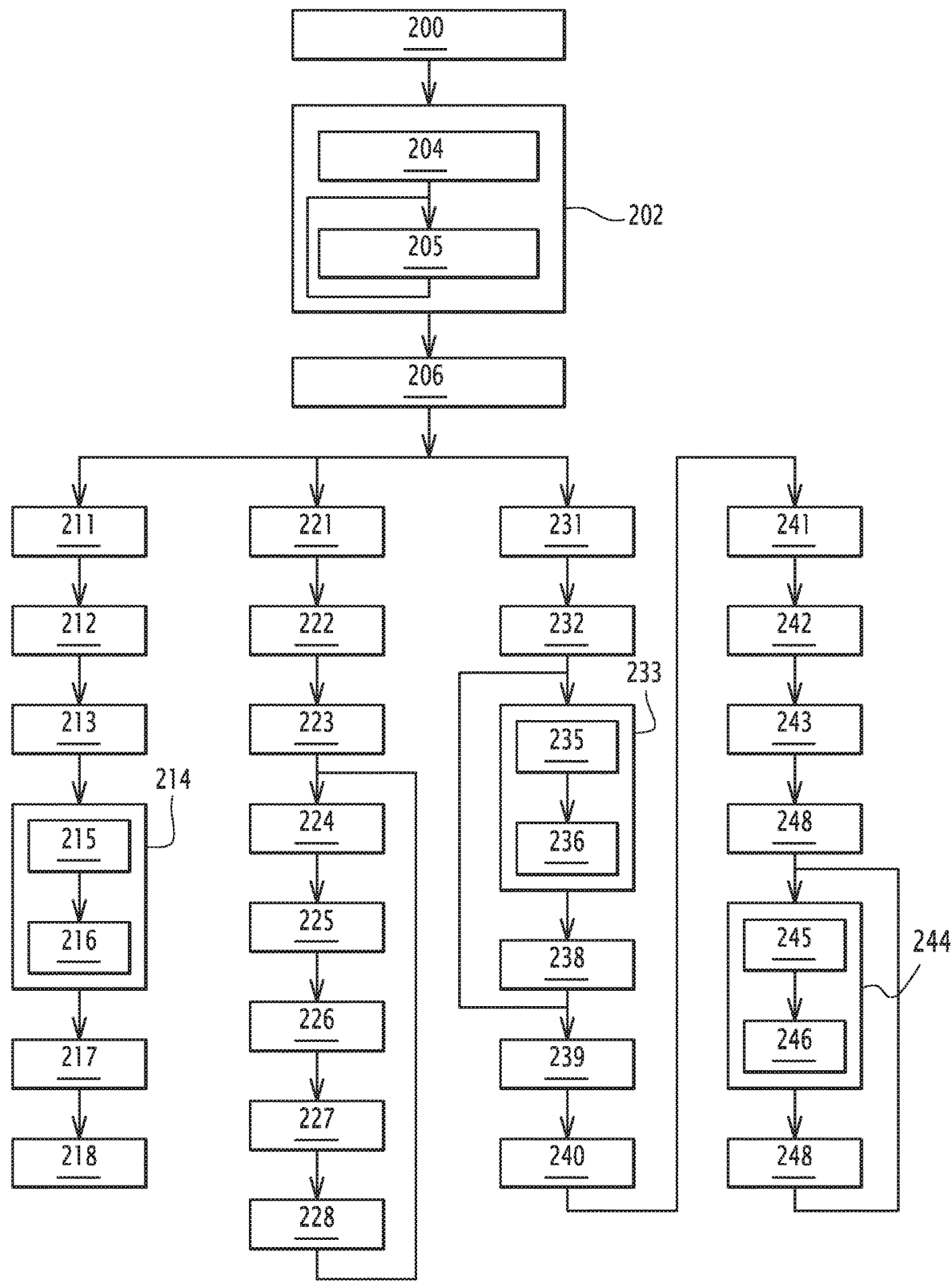
FIG. 10 is a block diagram illustrating the implementation of a display method according to one embodiment.

One example method for viewing information related to a flight by an aircraft, implemented using a display system as previously described, will now be described in reference to FIG. 10.

In an initial step 200, the module 36 generates an initial synthesis image and commands the display of that initial synthesis image on the viewing device 14, in particular in the window of the touchscreen 16 with length $L_f$ and width $l_f$.

In the described example, the initial synthesis image is an image according to the first type of perspective.

The initial synthesis image is centered on an initial central point of interest $Pc_0$, and seen from an initial point of view $P_v$ situated at an initial distance Z0 from the initial central point of interest $Pc_0$.

The initial synthesis image is for example exocentric. In particular, it will hereinafter be considered, as an example, that the initial central point of interest $Pc_0$ corresponds to the position of the aircraft.

The initial synthesis image represents an observation volume substantially corresponding to a pyramid, with an initial horizontal opening angle $a1_0$ and an initial vertical opening angle $a2_0$.

The initial horizontal opening angle $a1_0$ is for example set by default at 90 degrees, the initial vertical opening angle $a2_0$ then being adapted as a function of the length and width of the displayed image.

The initial vertical angular position $av_0$ can also be set by default, for example at a value of 30 degrees.

Furthermore, the initial observation distance $Z_0$ between the central point of interest $Pc_0$ and the point of view $Pv_0$ is preferably chosen such that a set of points of interest can be completely included in the observation pyramid.

The initial horizontal angular position $ah_0$ can also be set by default, for example at a value of 0 degrees.

The initial synthesis image comprises a synthetic depiction of the environment situated in the vicinity of the trajectory of the aircraft, on which a curve representative of a portion of the trajectory of the aircraft in that environment is superimposed.

The initial synthesis image also shows, if applicable, one or more symbolic objects, for example representative of the position of passage points, associated or not associated with constraints, altitude profile points associated with the trajectory of the aircraft, the position of the aircraft and/or objects that may interfere with the trajectory of the aircraft, for example clouds, storm cells or other aircraft.

The position of the point of view $Pv_0$ associated with the initial horizontal position $av_0$ is not necessarily that making it possible to view the trajectory of the aircraft optimally.

Thus, the module 36 preferably automatically determines an optimal position of the point of view making it possible to optimize the trajectory portion viewed in the image.

In particular, the module determines, during a step 202, an optimized position of the point of view, situated at the distance $Z_0$ from the central point of interest $Pc_0$, situated at the vertical angular position $av_0$ and at an optimized horizontal angular position $a_{hopt}$ making it possible to maximize the length of the trajectory portion viewed in the image, the opening angles a1 and a2 remained fixed.

During step 202, the module 36 determines, during a phase 204, a set of successive points on the trajectory of the aircraft, denoted Pi, according to a predetermined sampling, from an initial point that for example corresponds to the position of the aircraft, preferably in the downstream direction of that trajectory. For example, the points Pi are regularly spaced apart on the trajectory.

The module 36 next adjusts, during a phase 205 or during a plurality of successive phases 205 carried out iteratively, the horizontal angular position, from the initial horizontal angular position $a_{h0}$, so as to successively include the points Pi in the observation pyramid, while maintaining all of the points of interest in the observation pyramid.

Thus, during a first phase 205, the module 36 determines a first modified horizontal angular position $a_{h1}$. To that end, the module 36 determines a modified horizontal angular position such that the point $P_1$ is included in the observation pyramid, preferably so that the edge of the observation pyramid closest to the point $P_1$ before modification of the initial horizontal angular position $a_{h0}$ intersects the point $P_1$ when the horizontal position is equal to that modified horizontal angular position.

If this modified horizontal angular position is not comprised in the predefined authorized angular range for the horizontal angular position, the module 36 chooses, as first modified horizontal angular position $a_{h1}$, the boundary of this authorized range closest to the modified angular position thus determined.

If the modified vertical angular position is comprised in the predefined authorized angular range for the vertical angular position, the module 36 chooses, as the first modified vertical angular position av1, this modified angular position.

Then, during each following phase 205, the module 36 determines a new modified horizontal angular position ahi. To that end, the module 36 determines, during each phase, a modified horizontal angular position such that the point Pi is included in the observation pyramid, preferably so that the edge of the observation pyramid closest to the point Pi before modification of the modified horizontal angular position $ah_{i-1}$ determined during the preceding iteration of the phase 205 intersects the point Pi when the horizontal angular position is equal to that modified horizontal angular position.

Likewise, if the modified horizontal angular position is not comprised in the predefined authorized angular range for the horizontal angular position, the module 36 chooses the boundary of this authorized range closest to the determined angular position as the new modified horizontal angular position ahi.

If the modified horizontal angular position is comprised in the predefined authorized angular range for the horizontal angular position, the module 36 is able to choose this modified angular position as new modified horizontal angular position ahi.

During a final phase 205, the module 36 detects that it is not possible to find a horizontal angular position such that the considered point Pi of the trajectory is included in the observation pyramid without other points of the trajectory or points of the set of points of interest leaving the observation pyramid, and then ends the sequence of iterations. The optimal horizontal angular position $a_{hopt}$ is then chosen by the module 36 as the last determined modified angular position $ah_{i-1}$.

The optimal horizontal angular position $a_{hopt}$ is considered to be a new initial angular position.

The module 36 then determines a new initial point of view $Pv_0$ situated at the initial distance $Z_0$ from the initial central point of interest $Pc_0$, with an initial vertical angular position $av_0$ for example equal to 30 degrees and an initial horizontal angular position $ah_0$ equal to the optimal horizontal angular position $a_{hopt}$.

The module 36 then generates, during a step 206, a new initial synthesis image seen from the initial point of view $Pv_0$ and commands the display thereof by the display device 14.

Several actions to modify this initial synthesis image by an operator, as well as the steps implemented by the system 10 following these actions, will now be described successively.

In order to move the central point of interest along the trajectory of the aircraft, an operator selects the second modification mode of the central point of interest via the man-machine interface 18.

Then, during a step 211, the operator implements a modification action for the central point of interest, this action comprising moving a control member between an initial position and a final position. In the described example, this action comprises a movement of a control member, for example an operator's finger or a stylus, between an initial position and a final position on the touchscreen 16.

The module 36 detects this modification action during a step 212, and implements, in a plurality of successive moments during this movement, a series of steps in order to display, at each of these moments, a modified synthesis image centered on a modified point of interest.

In particular, at each of the successive moments, the module 36 detects the position of the control member during a step 213, this position being comprised between the initial position and the final position, and determines, during a step 214, a modified central point of interest denoted Pci as a function of the position of the control member at that moment. Each modified central point of interest Pci is situated along the curve 44.

This step 214 comprises a phase 215 for the determination by the module 36, as a function of the movement vector between the initial position of the control member and its position at the considered moment, of a curvilinear distance over a curve representative of the trajectory between the initial central point of interest $Pc_0$ and the modified central point of interest Pci.

Preferably, this curvilinear distance is determined as a function of the movement vector and of a vector tangent to the curve at the initial central point of interest $Pc_0$, in particular as a function of a scalar product between a projection of the movement vector over a horizontal plane of the initial synthesis image and that tangent vector.

Step 214 next comprises a phase 216 for the determination, by the module 36, of the position of the modified central point of interest Pci on the curve 44 from the position on the curve of the initial central point of interest $Pc_0$ and the curvilinear distance determined during phase 215.

After step 214, the module 36 generates, during a step 217, a modified synthesis image centered around the modified central point of interest Pci, and commands the display of that modified synthesis image on the touchscreen 16 during a step 218.

The sequence of steps 213, 214, 217 and 218 is implemented at a plurality of successive moments at least until the control member reaches its final position.

Thus, during the action by the operator to modify the position of the central point of interest, the central point of interest remains, at each moment, situated along the curve representative of the trajectory of the aircraft, irrespective of the movement done by the operator.

In order to modify the scale of the synthesis image, i.e., in the described example, to modify the observation distance Z, an operator implements an action during a step 221 to modify the scale via the man-machine interface 18.

This modification action comprises a movement of two control members, in particular two of the operator's fingers, on the touchscreen 16 in two substantially opposite directions, which is followed in the described example by maintenance of the two control members on the touchscreen 16 following their movement.

During a step 222, the module 36 detects this modification action, in particular detects the positioning of the two members on the touchscreen across from two separate initial points $P_1$ and P2, detects the position of these two initial points, and determines an initial distance $d_0$ between the initial points.

During a step 223, the module 36 determines a midpoint $P_m$ situated midway between these two initial points $P_1$ and P2, as well as a first zone 98, a second zone 100 and a third zone 102. The first, second and third zones are preferably centered on the midpoint $P_m$.

As described in reference to FIG. 6, the first, second and third zones 98, 100, 102 are defined by a first closed curve C1 and a second closed curve C2, situated within the first closed curve C1, the two curves C1 and C2 preferably being centered on the midpoint $P_m$.

The first zone 98, which includes the initial points $P_1$ and P2, is formed by the set of points contained between the first curve C1 and the second curve C2, the second zone 100 is formed by the set of points contained within the second curve C2, and the third zone 102 is formed by points situated outside the curves C1 and C2.

Then, during the scale modification action, the module 36 implements a series of steps at a plurality of successive moments during the movement of the two control members in order to display, at each of these moments, a modified synthesis image on a modified scale.

In particular, at each of these moments, the module 36 determines the position of the two control members during a step 224, then determines a scale modification factor $\gamma_i$ as a function of this position during a step 225.

In particular, the module 36 determines, at each moment, denoted ti, the scale modification factor $\gamma_i$ as a function of the position of the points across from which the control members are positioned relative to the first zone 98.

If, at the considered moment ti, the control members remain positioned on the touchscreen 16 across from points situated inside the first zone 98, the module 36 determines, during step 225, the sizing factor $\gamma_i$ according to the first computation mode described above.

According to this first embodiment, the module 36 determines, at the moment ti, the scale modification factor $\gamma_i$ as a function of the distance $d_i$ between the points across from which the control members are positioned at that moment ti and the distance $d_0$ between the initial points $P_1$ and P2. Preferably, the scale modification factor $\gamma_i$ is a strictly decreasing function of the distance di, for example a linear function of the deviation or the ratio between the distance $d_0$ and the distance di.

If, on the contrary, at the considered moment ti, at least one of the control members is positioned across from a point situated outside the first zone 98, i.e., inside the second zone 100 or the third zone 102, the module 36 determines, during step 225, the positioning factor $\gamma_i$ according to the second computation mode described above.

According to this second computation mode, the module 36 determines, at each moment t'i, the scale modification factor, denoted $\gamma'_i$, as a function of the maintenance duration of the control members outside the first zone 98. This maintenance duration, denoted Ti, corresponds to the time elapsed between the moment denoted $t'_0$ at which one or two control members have reached the boundaries of the first zone 98 and the moment t'i under consideration.

Preferably, according to this second computation mode, the control members are positioned on the touchscreen 16 across from points situated outside the first zone 98, the scale modification factor $\gamma'_i$ is independent of the position of the points of the screen situated across from these control members.

Then, during a step 226, the module 36 applies the scale modification factor $\gamma_i$ or $\gamma'_i$ determined at the considered moment to the initial synthesis image to determine a modified scale. In particular, in the described example, the module 36 determines a modified observation distance Zi by applying a factor $\gamma_i$ or $\gamma'_i$ to the initial distance $Z_0$, and determines a new point of view situated at the distance Zi from the central point of interest.

During a step 227, the module 36 generates a modified image at the modified scale thus determined, and commands the display of this modified synthesis image on the touchscreen 16 during a step 228.

Thus, during a scale modification action, the module 36 determines the scale modification factor according to the first computation mode, i.e., as a function of the distance $d_i$ between the opposite points at which the control members are positioned as long as these points remain situated in the first zone 98, then, once at least one of these points leaves the first zone 78, the module 36 determines the scale modification factor according to the second computation mode, i.e., as a function of the maintenance duration of the point(s) outside the first zone.

The sequence of steps 224, 225, 226, 227 and 228 is implemented at a plurality of successive moments at least until the control members are released from the touchscreen 16.

Once the control members are no longer positioned on the touchscreen 16, the modification action of the dimensions of the zone displayed by the synthesis image stops.

Preferably, during a step 228, the module 36 compares the dimensions $A_{1n}$ and $A_{2n}$ or the distance $Z_n$ associated with the last generated modified image to predetermined dimension or distance threshold, and determines the dimension thresholds, the distance threshold, respectively, closest to the dimensions $A_{1n}$ and $A_{2n}$ or the distance $Z_n$.

The module 36 then generates a final modified image depicting a zone whereof the dimensions correspond to the closest dimension thresholds determined and/or seen from a distance Z equal to the determined distance threshold, and commands the display thereof on the touchscreen 16.

To go from the initial synthesis image according to the first type of perspective to a synthesis image according to the second type of perspective, for example seen from above, during a step 231, the operator performs a modification action using the man-machine interface 18, for example by actuating a dedicated icon superimposed on the synthesis image by the module 36.

During a step 232, the module 36 detects this modification action, then generates, during a plurality of successive steps 233, a plurality of successive transition synthesis images between the initial synthesis image according to the first type of perspective and the synthesis image according to the second type of perspective.

The transition images are intended to be displayed on the viewing device 14 at a plurality of successive transition moments ti, between an initial display moment of the initial synthesis image and a final display moment of the synthesis image according to the second type of perspective.

Each transition image generated during a step 233 is an image according the first type of perspective.

Each transition image generated during a step 233 is centered around an intermediate central point of interest Pci, is seen from an intermediate point of view Pvi, situated at an intermediate observation distance Zi, and is seen from an intermediate horizontal opening angle a1$i$ and an intermediate vertical opening angle a2$i$. Each transition image depicts a zone of the environment with an intermediate length A1$i$ and intermediate width A2$i$, the ratio between the intermediate length A1$i$ and the intermediate width A2$i$ remaining constant and equal to the ratio between the length A1 and the width A2 of the three-dimensional synthesis image. As indicated above, the horizontal a1$i$ and vertical a2$i$ intermediate opening angles being connected to one another as a function of the ratio between the intermediate length A1$i$ and the intermediate width A2$i$ that remains constant, the "opening angle" will hereinafter generally refer to one or the other of these opening angles, for example the intermediate horizontal opening angle a1$i$.

Each step 233 comprises a phase 235 for the determination, by the module 36, of the intermediate opening angle a1$i$ and the intermediate observation distance Z$i$ of the transition image intended to be displayed at the transition moment t$i$ associated with that step.

As explained above, the opening angle a1$i$ of each transition image is thus a decreasing function, preferably strictly decreasing, of the transition moment t$i$ at which this transition image is intended to be displayed, and the intermediate observation distance Z$i$ of each transition image is an increasing function, preferably strictly increasing, of the transition moment at which this transition image is intended to be displayed.

Preferably, the intermediate observation distance Z$i$ of the transition image is determined during each phase 235 according to a nonlinear increasing function, in particular convex, of the transition moment at which this transition image is intended to be displayed, as illustrated in FIG. 7.

Furthermore, during each phase 235, the module 36 determines the intermediate opening angle a1$i$ of the transition image as a function of the intermediate observation distance Z$i$ determined for that transition image, according to a nonlinear decreasing function of the transition moment t$i$ at which this transition image is intended to be displayed.

In particular, the intermediate opening angle a1$i$ of a transition image is determined as a function of the intermediate observation distance Z$i$ such that the length of the zone depicted by the transition image is comprised in a predetermined bounded interval around the length A1$_0$ of the zone depicted by the three-dimensional initial synthesis image.

For example, the intermediate opening angle a1$i$ of each transition image is determined as a function of the opening angle a1$_0$ of the initial three-dimensional synthesis image, the virtual opening angle a1'$i$ and the transition moment t$i$ at which the transition image is intended to be displayed.

Preferably, during each phase 235, the intermediate opening angle a1$i$ of the transition image is determined as a weighted average between the opening angle a1$_0$ of the initial synthesis image and the virtual opening angle a1'$i$, the weight coefficients of which vary as a function of the transition moment t$i$ at which the transition image is intended to be displayed.

In particular, the intermediate opening angle a1$i$ is determined during each phase 235 according to a function of the type:

$$a1_i = (1-Y)*a1_0 + Y*a1'_i.$$

Each phase 235 is followed by a phase 236 for generating a transition image seen along the intermediate opening angle a1$i$ and the intermediate observation distance Z$i$ determined for that transition image during phase 235.

Each step 233 for generating a transition image is followed by a step 238 for the command, by the module 36, of the display of that transition image by the display device 14 at the transition moment t$i$ associated with that transition image.

The gradual increase of the opening angle a1$i$ from one transition image to the next makes it possible to produce a fluid transition between the synthesis image according to the first type of perspective and the synthesis image according to the second type of perspective. Furthermore, the gradual decrease of the observation distance Z$i$ makes it possible to keep a zone length depicted by the transition images substantially identical to the length of the zone intended to be depicted by the synthesis image according to the second type of perspective and therefore contributes to providing a fluid transition between the initial synthesis image according to the first type of perspective and the final synthesis image according to the second type of perspective.

Then, following the set of successive steps 233 and 238, during a step 239, the module 36 generates a synthesis image according to the second type of perspective and commands the display thereof by the viewing device 14 during a step 240.

Preferably, the synthesis image according the second type of perspective, as well as the transition images, are centered on the same central point of interest as the initial synthesis image t according to the first type of perspective. Furthermore, the length and width of the zone depicted by the final image are substantially equal to the length and width of the zone depicted by the initial image.

Similarly, to go from the initial synthesis image according to the second type of perspective to a final synthesis image according to the first type of perspective, during a step 241, the operator performs a modification action using the man-machine interface 18, for example by actuating a dedicated icon superimposed on the synthesis image by the module 36.

During a step 242, the module 36 detects this modification action, then generates, during a plurality of successive steps, a plurality of successive transition synthesis images between the initial synthesis image and the final synthesis image.

The transition images are intended to be displayed on the viewing device 14 at a plurality of successive transition moments t$i$, between an initial display moment of a first transition image and a final display moment of the final synthesis image according to the first type of perspective.

During a first step 243, the module 36 generates the first transition image. During this step 243, the module 36 determines a first small intermediate opening angle a11 and a first large intermediate observation distance Z1. The first intermediate opening angle is for example equal to 5°. The first intermediate observation distance is for example equal to 1600 km.

Then, the module 36 generates the first transition image. The first transition image is centered around an intermediate central point of interest Pc1, is seen from an intermediate point of view Pv1, situated at the intermediate observation distance Z1 from the intermediate central point of interest Pc1. The first transition image is further seen from the intermediate horizontal opening angle a11 and an associated intermediate vertical opening angle a21.

Then, during a plurality of successive steps 244, the module 36 generates a plurality of successive transition synthesis images between the first transition image and the final three-dimensional synthesis image.

Each transition image generated during a step 244 is an image according to the first type of perspective.

Each transition image generated during a step 244 is centered around a central intermediate point of interest Pc$i$, is seen from an intermediate point of view Pv$i$, situated at an intermediate observation distance Zi, and is seen along an intermediate opening angle a1i.

Each step 244 comprises a phase 245 for the determination, by the module 36, of the intermediate opening angle a1i and the intermediate observation distance Zi of the transition image intended to be displayed at the transition moment ti associated with that step.

As explained above, the opening angle a1i of each transition image is thus an increasing function, preferably strictly increasing, of the transition moment ti at which this transition image is intended to be displayed, and the intermediate observation distance Zi of each transition image is a decreasing function, preferably strictly decreasing, of the transition moment ti at which this transition image is intended to be displayed, such that the zone displayed by the successive transition images remains substantially the same.

Preferably, the intermediate observation distance Zi of the transition image is determined during each phase 245 according to a nonlinear decreasing function, in particular convex, of the transition moment at which this transition image is intended to be displayed, as illustrated in FIG. 7.

Furthermore, during each phase 245, the module 36 determines the intermediate opening angle a1i of the transition image as a function of the intermediate observation distance Zi determined for that transition image, according to a nonlinear increasing function of the transition moment ti at which this transition image is intended to be displayed.

In particular, the intermediate opening angle a1i of a transition image is determined as a function of the intermediate distance Zi such that the length of the zone depicted by the transition image is comprised in a predetermined bounded interval around the length of the zone intended to be depicted by the final synthesis image, which is substantially equal to the length of the zone depicted by the initial synthesis image and the length of the zone depicted by the first transition image.

For example, the intermediate opening angle a1i of each transition image is determined as a function of the opening angle a11 of the final synthesis image, the virtual opening angle a'1i defined above, and the transition moment ti at which the transition image is intended to be displayed.

For example, the intermediate opening angle a1i of each transition image is determined, during phase 245, as a function of the opening angle a1 of the final synthesis image, the virtual opening angle a'1i and the transition moment ti at which the transition image is intended to be displayed, as indicated above.

Each phase 245 is followed by a phase 246 for generating a transition image seen along the intermediate opening angle a1i and the intermediate observation distance Zi determined for that transition image during phase 245.

Each of steps 243 and 244 is followed by a control step 248 for the command, by the module 36, of the display of that transition image by the display device 14 at the transition moment ti associated with that transition image. The last transition image corresponds to the final image.

It must be understood that the example embodiments described above are not limiting.

In particular, according to one alternative, the tactile control device is separate from the display device 14. For example, the tactile control device is a trackpad.

According to one alternative, the man-machine interface comprises, to replace or in addition to the tactile control device, one or more control members, for example a mouse or joystick and/or a keyboard, a virtual rotator, etc.

For example, an action to modify the position of the central point of interest of the first or second type described above may consist of a movement of an object, such as a cursor, over the displayed synthesis image, using a control member, up to an icon 80 or any position on the synthesis image, for example followed by actuation of a key of a keyboard or a button. A modification action of the position of the central point of interest of the third type described above may also consist of moving an object, such as a cursor, on the displayed synthesis image, using a control member, while keeping a button or key actuated.

Furthermore, the synthesis images generated and displayed do not necessarily reflect the environment of the aircraft and its position in real-time. In particular, the synthesis images may correspond to a simulation of the flight of the aircraft or a particular phase of the flight of the aircraft be displayed before, during or after that flight or phase. For example, synthesis images illustrating an approach phase of the aircraft may be displayed during the flight of the aircraft, before this approach phase.

What is claimed is:

1. A system destined to display information related to a flight of an aircraft, the system comprising:
   a dynamic synthesis image generator configured to dynamically generate synthesis images, each synthesis image comprising a depiction of the environment situated in a vicinity of a trajectory of the aircraft,
   the dynamic synthesis image generator being configured to generate successive three-dimensional transition synthesis images, the three-dimensional transition synthesis images including a first succession of at least two successive three-dimensional transitional synthesis images and/or a second succession of at least two successive three-dimensional transitional synthesis images, the first succession of at least two successive three-dimensional transitional synthesis images being generated between a three-dimensional synthesis image according to a first type of perspective and a synthesis image according to a second type of perspective, the second succession of at least two successive three-dimensional transitional synthesis images being generated between a synthesis image according to a second type of perspective and a three-dimensional synthesis image according to a first type of perspective, the dynamic synthesis image generator being configured to command the successive display of the first succession and/or the second succession of three-dimensional transition synthesis images by a display at successive transition moments,
   each of the three-dimensional transition synthesis images being depicted according to the first type of perspective, each of the three-dimensional transition synthesis images being centered on an intermediate central point of interest, each of the three-dimensional transition synthesis images being seen from an intermediate point of view located at an intermediate observation distance from the intermediate central point of interest, each of the three-dimensional transition synthesis images being seen from an intermediate opening angle,
   the intermediate observation distances of the successive three-dimensional transition synthesis images of the first succession being an increasing function of the transition moments at which the successive three-dimensional transition synthesis images of the first succession are displayed, and the intermediate opening angles of the successive three-dimensional transition synthesis images of the first succession being a decreasing function of the transition moments at which the successive three-dimensional transition synthesis images of the first succession are displayed, the intermediate observation distances of the successive three-dimensional transition synthesis images of the second succession being a decreasing function of the transition moments at which the successive three-dimensional transition synthesis images of the second succession are displayed, and the intermediate opening angles of the successive three-dimensional transition synthesis images of the second succession being an increasing function of the transition moments at which the successive three-dimensional transition synthesis images of the second succession are displayed, wherein there exists at least one first and one second successive transition moments, the second transition moment being after the first transition moment, such that:

the intermediate observation distance of a first three-dimensional transition synthesis image of the first succession destined to be displayed at the first transition moment is strictly less than the intermediate observation distance of a second three-dimensional transition synthesis image of the first succession destined to be displayed at the second transition moment, and the intermediate opening angle of the first three-dimensional transition synthesis image of the first succession is strictly larger than the intermediate opening angle of the second three-dimensional transition synthesis image of the first succession, the intermediate observation distance of a first three-dimensional transition synthesis image of the second succession destined to be displayed at the first transition moment is strictly greater than the intermediate observation distance of a second three-dimensional transition synthesis image of the second succession destined to be displayed at the second transition moment, and the intermediate opening angle of the first three-dimensional transition synthesis image of the second succession is strictly smaller than the intermediate opening angle of the second three-dimensional transition synthesis image of the second succession, wherein the dynamic synthesis image generator is configured to determine the intermediate observation distances of the successive three-dimensional transition synthesis images of the first and/or second succession according to a nonlinear function of the transition moments at which the three-dimensional transition synthesis images are displayed.

2. The system according to claim 1 wherein the intermediate observation distances of the successive three-dimensional transition synthesis images of the first succession are a strictly increasing function of the transition moments at which the successive three-dimensional transition synthesis images of the first succession are displayed, and the intermediate observation distances of the successive three-dimensional transition synthesis images of the second succession are a strictly decreasing function of the transition moments at which the successive three-dimensional transition synthesis images of the second succession are displayed.

3. The system according to claim 1 wherein the nonlinear function is a convex function.

4. The system according to claim 1 wherein the intermediate opening angle of the successive three-dimensional transition synthesis images of the first succession are a strictly decreasing function of the transition moment at which the successive three-dimensional transition synthesis images of the first succession are displayed, and the intermediate opening angle of the successive three-dimensional transition synthesis images of the second succession are a strictly increasing function of the transition moment at which the successive three-dimensional transition synthesis images of the second succession are displayed.

5. The system according to claim 1 wherein, the synthesis image according to the first perspective type being centered around a given central point of interest, seen from a point of view situated at a given observation distance from the central point of interest, and seen from a given opening angle, the intermediate opening angle of each three-dimensional transition synthesis image is strictly larger than the opening angle of the synthesis image according to the first perspective type, and the intermediate observation distance of each three-dimensional transition synthesis image is strictly greater than the observation distance of the synthesis image according to the first perspective type.

6. The system according to claim 5 wherein the dynamic synthesis image generator is configured to determine the intermediate opening angles and the intermediate observation distances of the successive three-dimensional transition synthesis images as a function of the opening angle and the observation distance of the synthesis image according to the first type of perspective.

7. The system according to claim 6 wherein the dynamic synthesis image generator is configured to determine the intermediate opening angles and the intermediate observation distances of the successive three-dimensional transition synthesis images as a function of the opening angle and the observation distance of the synthesis image according to the first type of perspective such that at least one dimension of the zone depicted by each three-dimensional transition synthesis image is comprised in a predetermined bounded interval around the corresponding dimension of the zone depicted by the synthesis image according to the first type of perspective.

8. The system according to claim 1 wherein the dynamic synthesis image generator is configured to:
   command the display of the synthesis image according to the first type of perspective at an initial moment;
   command the successive display of the successive three-dimensional transition synthesis images between the synthesis image according to the first type of perspective and the synthesis image according to the second type of perspective at the successive transition moments, the transition moments being after the initial moment; and
   command the display of the synthesis image according to the second type of perspective at a final moment after the transition moments.

9. The system according to claim 1 wherein the dynamic synthesis image generator is configured to:
   command the display of the synthesis image according to the second type of perspective at an initial moment,
   command the successive display of the successive three-dimensional transition synthesis images between the synthesis image according to the second type of perspective and the synthesis image according to the first type of perspective at the successive transition moments, the transition moments being after the initial moment, and
   command the display of the synthesis image according to the first type of perspective at a final moment after the transition moments.

10. The system according to claim 1 wherein the dynamic synthesis image generator is configured to assign a depth attribute to each pixel of a synthesis image located in a zone with a predetermined depth of the three-dimensional transition synthesis images, with the exception of pixels situated outside the predetermined depth zone, the predetermined depth zone being defined at least by a predetermined maximum altitude.

* * * * *